United States Patent
Yang et al.

(10) Patent No.: US 10,788,981 B2
(45) Date of Patent: Sep. 29, 2020

(54) METHOD AND APPARATUS FOR PROCESSING NEW MESSAGE ASSOCIATED WITH APPLICATION

(71) Applicant: Huawei Technologies Co., Ltd., Shenzhen (CN)

(72) Inventors: Zhuolin Yang, Beijing (CN); Long Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 15/320,927

(22) PCT Filed: Mar. 31, 2015

(86) PCT No.: PCT/CN2015/075501
§ 371 (c)(1),
(2) Date: Dec. 21, 2016

(87) PCT Pub. No.: WO2016/154893
PCT Pub. Date: Oct. 6, 2016

(65) Prior Publication Data
US 2017/0153809 A1   Jun. 1, 2017

(51) Int. Cl.
*G06F 3/0484*  (2013.01)
*G06F 3/0488*  (2013.01)
*G06F 3/0346*  (2013.01)

(52) U.S. Cl.
CPC ........ *G06F 3/04883* (2013.01); *G06F 3/0346* (2013.01); *G06F 3/0484* (2013.01);
(Continued)

(58) Field of Classification Search
CPC ..... G06F 3/0488; G06F 3/0346; G06F 3/0484
See application file for complete search history.

(56) References Cited

U.S. PATENT DOCUMENTS 7,293,279 B1 * 11/2007 Asmussen ............ H04N 5/4401
                                                                        348/E5.099
7,783,283 B2 * 8/2010 Kuusinen .............. H04M 1/575
                                                                        455/412.2
(Continued)

FOREIGN PATENT DOCUMENTS

CN   103685731 A   3/2014
CN   103970774 A   8/2014
(Continued)

OTHER PUBLICATIONS

Machine Translation and Abstract of Japanese Publication No. JP2014089508, May 15, 2014, 29 pages.
(Continued)

*Primary Examiner* — Phenuel S Salomon
(74) *Attorney, Agent, or Firm* — Conley Rose, P.C.

(57) ABSTRACT

The present invention discloses a method including: applied to a portable electronic device including a display and multiple application programs, where the display includes a touch-sensitive surface and a display screen. The method includes: displaying a first application interface element in a first area of the display screen, where the first application interface element is corresponding to a first application program; displaying a second application interface element in a second area of the display screen, where the second application interface element indicates that a new message corresponding to the first application program is generated, and the second area and the first area at least partially overlap; detecting a first gesture; and displaying the second application interface element in a third area of the display screen to respond to the first gesture, where the third area and the first area do not overlap.

20 Claims, 12 Drawing Sheets

(52) U.S. Cl.
CPC ............ *G06F 3/04845* (2013.01); *G06F 2203/04803* (2013.01); *G06F 2203/04808* (2013.01)

(56) References Cited

U.S. PATENT DOCUMENTS

| | | | |
|---|---|---|---|
| 8,014,760 B2* | 9/2011 | Forstall | H04M 1/27475 455/412.2 |
| 8,780,130 B2* | 7/2014 | Morris | G06F 3/0484 345/581 |
| 10,123,275 B2* | 11/2018 | Chang | H04W 52/0229 |
| 2002/0077086 A1* | 6/2002 | Tuomela | H04W 4/16 455/414.1 |
| 2006/0007051 A1* | 1/2006 | Bear | G06Q 10/107 345/1.1 |
| 2006/0101350 A1* | 5/2006 | Scott | G06F 3/04817 715/779 |
| 2007/0220444 A1* | 9/2007 | Sunday | G06F 3/0488 715/788 |
| 2008/0001924 A1* | 1/2008 | de los Reyes | G06F 3/04886 345/173 |
| 2009/0112708 A1* | 4/2009 | Barhydt | G06Q 30/0257 705/14.55 |
| 2009/0247112 A1* | 10/2009 | Lundy | G06F 3/0237 455/404.1 |
| 2009/0292989 A1* | 11/2009 | Matthews | G06F 3/0488 715/702 |
| 2010/0211919 A1* | 8/2010 | Brown | G06F 3/04817 715/863 |
| 2010/0248788 A1* | 9/2010 | Yook | G06F 3/0481 455/566 |
| 2011/0107272 A1* | 5/2011 | Aguilar | G06F 3/04815 715/853 |
| 2012/0094642 A1* | 4/2012 | Popperl | H04M 3/42076 455/415 |
| 2012/0131501 A1* | 5/2012 | Lazaridis | G06F 3/0488 715/804 |
| 2012/0162261 A1 | 6/2012 | Kim et al. | |
| 2012/0293433 A1* | 11/2012 | Yamamoto | G06F 3/0412 345/173 |
| 2013/0082959 A1* | 4/2013 | Shimazu | G06F 3/04886 345/173 |
| 2013/0086522 A1 | 4/2013 | Shimazu et al. | |
| 2013/0097556 A1* | 4/2013 | Louch | G06F 3/0488 715/790 |
| 2013/0145295 A1* | 6/2013 | Bocking | G06F 3/017 715/764 |
| 2013/0227495 A1* | 8/2013 | Rydenhag | G06F 3/0484 715/863 |
| 2013/0321340 A1* | 12/2013 | Seo | G06F 1/1641 345/174 |
| 2013/0326415 A1* | 12/2013 | Park | G06F 3/04817 715/835 |
| 2014/0026098 A1* | 1/2014 | Gilman | G06F 3/0482 715/810 |
| 2014/0080465 A1* | 3/2014 | Cho | H04W 4/12 455/415 |
| 2014/0143738 A1* | 5/2014 | Underwood, IV | H04L 51/38 715/863 |
| 2014/0267094 A1* | 9/2014 | Hwang | G06F 3/0488 345/173 |
| 2014/0304646 A1 | 10/2014 | Rossmann | |
| 2014/0351748 A1* | 11/2014 | Xia | G06F 3/0481 715/798 |
| 2015/0099482 A1* | 4/2015 | Schmitz | G06F 16/1873 455/404.2 |
| 2015/0128055 A1* | 5/2015 | Yasar | H04M 1/72519 715/736 |
| 2015/0186008 A1* | 7/2015 | Hicks | G06F 3/04817 715/765 |
| 2015/0215245 A1* | 7/2015 | Carlson | G06F 3/04883 715/752 |
| 2015/0334118 A1 | 11/2015 | Yuan et al. | |
| 2015/0365306 A1* | 12/2015 | Chaudhri | G06F 3/0416 715/736 |
| 2016/0065509 A1* | 3/2016 | Yang | H04L 51/22 715/752 |
| 2016/0205245 A1* | 7/2016 | Kim | H04M 1/576 455/414.1 |
| 2016/0231870 A1* | 8/2016 | Summa | G06F 3/0481 |
| 2016/0234381 A1* | 8/2016 | Alfano | H04M 1/72552 |
| 2017/0371535 A1* | 12/2017 | Li | G06F 3/04817 |

FOREIGN PATENT DOCUMENTS

| | | |
|---|---|---|
| CN | 104077183 A | 10/2014 |
| CN | 104166717 A | 11/2014 |
| CN | 104331216 A | 2/2015 |
| CN | 104360791 A | 2/2015 |
| CN | 104375759 A | 2/2015 |
| JP | 2013093020 A | 5/2013 |
| JP | 2014089508 A | 5/2014 |
| KR | 20090111040 A | 10/2009 |
| KR | 20120071468 A | 7/2012 |

OTHER PUBLICATIONS

Foreign Communication From a Counterpart Application, Japanese Application No. 2017-549567, Japanese Notice of Allowance dated Jul. 3, 2018, 3 pages.
Machine Translation and Abstract of Chinese Publication No. CN103685731, Mar. 26, 2014, 10 pages.
Machine Translation and Abstract of Chinese Publication No. CN104077183, Oct. 1, 2014, 10 pages.
Machine Translation and Abstract of Chinese Publication No. CN104166717, Nov. 26, 2014, 20 pages.
Machine Translation and Abstract of Chinese Publication No. CN104375759, Feb. 25, 2015, 19 pages.
Foreign Communication From a Counterpart Application, European Application No. 15886879.4, Extended European Search Report dated Mar. 31, 2017, 8 pages.
Foreign Communication From a Counterpart Application, PCT Application No. PCT/CN2015/075501, English Translation of International Search Report dated Jan. 5, 2016, 2 pages.
Machine Translation and Abstract of Chinese Publication No. CN104331216, Feb. 4, 2015, 18 pages.
Machine Translation and Abstract of Chinese Publication No. CN104360791, Feb. 18, 2015, 30 pages.
Foreign Communication From a Counterpart Application, Chinese Application No. 201580007732.6, Chinese Office Action dated Sep. 19, 2018, 10 pages.
Machine Translation and Abstract of Korean Publication No. KR20090111040, Oct. 26, 2009, 29 pages.
Foreign Communication From a Counterpart Application, Korean Application No. 10-2016-7035819, Korean Office Action dated Oct. 19, 2018, 6 pages.
Foreign Communication From a Counterpart Application, Korean Application No. 10-2016-7035819, English Translation of Korean Office Action dated Oct. 19, 2018, 4 pages.

* cited by examiner

CONT.
FROM
FIG. 3B

| | |
|---|---|
| Calculator desktop applet | 149-3 |
| Alarm clock desktop applet | 149-4 |
| Dictionary desktop applet | 149-5 |
| ⋮ | |
| Desktop applet created by a user | 149-6 |
| Desktop applet creating module | 150 |
| Search module | 151 |
| Video and music player module | 152 |
| Drawing module | 380 |
| Presentation module | 382 |
| Word processing module | 384 |
| Web page creating module | 386 |
| Disk editing module | 388 |
| Spreadsheet module | 390 |
| Sound/audio recorder module | 163 |
| Notification module | 165 |
| ⋮ | |
| Device/global internal status | 157 |
| Camera film | 159 |
| Digital image pipeline | 161 |

FIG. 3C

METHOD AND APPARATUS FOR PROCESSING NEW MESSAGE ASSOCIATED WITH APPLICATION

CROSS-REFERENCE TO RELATED APPLICATION

This application is a National Stage of International Application No. PCT/CN2015/075501, filed on Mar. 31, 2015, which is hereby incorporated by reference in its entirety.

TECHNICAL FIELD

The present invention relates to the communications field, and in particular, to a method and an apparatus for processing a new message associated with an application.

BACKGROUND

When a mobile phone receives an unread message or a reminder that an application has an update version, the message or the reminder is generally displayed on an upper right corner of a corresponding icon on a desktop of the mobile phone in a form of an unread prompt (for example, a small red dot). When there are quite many applications having small red dots, not only cleanness and aesthetic feeling of a homepage of the mobile phone are greatly affected, but more importantly, efficiency of using the desktop by a user is affected. When the user wants to cancel the small red dot, the user needs to tap the icon to start a program interface in full screen, and execute various operations. An entire cancellation process has rather low efficiency, and the process is tedious. In addition, starting an application to perform an unread operation occupies a large quantity of system resources. For a user who has a slight obsessive-compulsive disorder, the conventional operation manner is more inconvenient.

SUMMARY

Embodiments of the present invention provide a method and an apparatus for processing a new message associated with an application, which may be convenient to independently manage a new message associated with an application, thereby saving system resources occupied by starting the application associated with the new message each time the new message is to be processed.

According to a first aspect, an embodiment of the present invention provides a portable electronic device, and including: a display, where the display includes a touch-sensitive surface and a display screen; one or more processors; a memory; multiple application programs; and one or more programs, where the one or more programs are stored in the memory and configured to be executed by the one or more processors, the one or more programs include instructions, and the instructions are used to: display a first application interface element in a first area of the display screen, where the first application interface element is corresponding to a first application program; display a second application interface element in a second area of the display screen, where the second application interface element indicates that a new message corresponding to the first application program is generated, and the second area and the first area at least partially overlap; detect a first gesture; and display the second application interface element in a third area of the display screen to respond to the first gesture, where the third area and the first area do not overlap.

According to a second aspect, an embodiment of the present invention provides a portable electronic device, and including: a display, where the display includes a touch-sensitive surface and a display screen; one or more processors; a memory; multiple application programs; and one or more programs, where the one or more programs are stored in the memory and configured to be executed by the one or more processors, the one or more programs include instructions, and the instructions are used to: display a first application interface element in a first area of the display screen, where the first application interface element is corresponding to a first folder that includes at least two first application programs; display a second application interface element in a second area of the display screen, where the second application interface element indicates that at least one first application program in the first folder generates a new message corresponding to the at least one first application program, and the second area and the first area at least partially overlap; detect a first gesture; and display the second application interface element in a third area of the display screen to respond to the first gesture, where the third area and the first area do not overlap.

With reference to a first possible implementation manner of the second aspect, in a first possible implementation manner of the second aspect, the detecting a first gesture includes: detecting, on the touch-sensitive surface, that the second application interface element is dragged to leave the first application interface element.

With reference to a first possible implementation manner of the second aspect, in a second possible implementation manner of the second aspect, the detecting a first gesture includes: detecting that the portable electronic device is shaken.

With reference to a first possible implementation manner of the second aspect, in a third possible implementation manner of the second aspect, the detecting a first gesture includes: detecting, on the touch-sensitive surface, that the second application interface element is slid.

With reference to a first possible implementation manner of the second aspect, in a fourth possible implementation manner of the second aspect, the detecting a first gesture includes: detecting, on the touch-sensitive surface, that the first application interface element is slid.

With reference to a first possible implementation manner of the second aspect, in a fifth possible implementation manner of the second aspect, the detecting a first gesture includes: detecting, on the touch-sensitive surface, that both the first application interface element and the second application interface element are dragged to be separated.

With reference to any one of the first to the fifth possible implementation manners of the second aspect, in a sixth possible implementation manner, before the detecting a first gesture, the instructions further include: detecting, on the touch-sensitive surface, that the second application interface element is touched and held.

With reference to any one of the first to the fifth possible implementation manners of the second aspect, in a seventh possible implementation manner, before the detecting a first gesture, the instructions further include: detecting that the portable electronic device is shaken.

With reference to any one of the first to the fifth possible implementation manners of the second aspect, in an eighth possible implementation manner, before the detecting a first gesture, the instructions further include: detecting, on the touch-sensitive surface, that the second application interface element is slid.

With reference to any one of the first to the fifth possible implementation manners of the second aspect, in a ninth possible implementation manner, before the detecting a first gesture, the instructions further include: detecting, on the touch-sensitive surface, that the first application interface element is slid.

With reference to any one of the first to the ninth possible implementation manners of the second aspect, in a tenth possible implementation manner, if the at least two first application programs generate new messages corresponding to the at least two first application programs, the displaying the second application interface element in a third area of the display screen includes: arranging the second application interface elements in a separation manner or in a combination manner, and displaying the second application interface elements in the third area.

With reference to the tenth possible implementation manner of the second aspect, in an eleventh possible implementation manner, after the second application interface elements are arranged in a separation manner and displayed in the third area, or the second application interface elements are arranged in a combination manner and displayed in the third area, the instructions further include: detecting, on the touch-sensitive surface, that one second application interface element of the at least two second application interface elements is selected; and displaying, in a fourth area of the display screen, content of the generated new message that is corresponding to the first application program and indicated by the second application interface element.

With reference to the first possible implementation manner of the second aspect, in a twelfth possible implementation manner, after the detecting, on the touch-sensitive surface, that the second application interface element is dragged to leave the first application interface element, the instructions further include: detecting, on the touch-sensitive surface, that dragging the second application interface element is stopped; and displaying, in a fourth area of the display screen, content of the generated new message that is corresponding to the first application program and indicated by the second application interface element.

With reference to the fifth possible implementation manner of the second aspect, in a thirteenth possible implementation manner, after the detecting, on the touch-sensitive surface, that both the first application interface element and the second application interface element are dragged to be separated, the instructions further include: detecting, on the touch-sensitive surface, that both dragging the first application interface element and dragging the second application interface element are stopped; and displaying, in a fourth area of the display screen, content of the generated new message that is corresponding to the first application program and indicated by the second application interface element.

With reference to any possible implementation manner of the eleventh possible implementation manner, the twelfth possible implementation manner, and the thirteenth possible implementation manner, in a fourteenth possible implementation manner, after the displaying, in a fourth area of the display screen, content of the generated new message that is corresponding to the first application program and indicated by the second application interface element, the instructions further include: detecting, on the touch-sensitive surface, that a fifth area outside the fourth area is tapped, and stopping displaying, in the fourth area of the display screen, the content of the generated new message that is corresponding to the first application program and indicated by the second application interface element.

According to a third aspect, an embodiment of the present invention provides an information processing apparatus used in a portable electronic device including a display and multiple application programs, where the display includes a touch-sensitive surface and a display screen, and the information processing apparatus includes: an apparatus that is configured to display a first application interface element in a first area of the display screen, where the first application interface element is corresponding to a first application program; an apparatus that is configured to display a second application interface element in a second area of the display screen, where the second application interface element indicates that a new message corresponding to the first application program is generated, and the second area and the first area at least partially overlap; an apparatus that is configured to detect a first gesture; and an apparatus that is configured to display the second application interface element in a third area of the display screen to respond to the first gesture, where the third area and the first area do not overlap.

According to a fourth aspect, an embodiment of the present invention provides an information processing apparatus used in a portable electronic device including a display and multiple application programs, where the display includes a touch-sensitive surface and a display screen, and the information processing apparatus includes: an apparatus that is configured to display a first application interface element in a first area of the display screen, where the first application interface element is corresponding to a first folder that includes at least two first application programs; an apparatus that is configured to display a second application interface element in a second area of the display screen, where the second application interface element indicates that at least one first application program in the first folder generates a new message corresponding to the at least one first application program, and the second area and the first area at least partially overlap; an apparatus that is configured to detect a first gesture; and an apparatus that is configured to display the second application interface element in a third area of the display screen to respond to the first gesture, where the third area and the first area do not overlap.

With reference to a first possible implementation manner of the fourth aspect, in a first possible implementation manner of the fourth aspect, the apparatus that is configured to detect a first gesture includes: an apparatus that is configured to detect, on the touch-sensitive surface, that the second application interface element is dragged to leave the first application interface element.

With reference to a first possible implementation manner of the fourth aspect, in a second possible implementation manner of the fourth aspect, the apparatus that is configured to detect a first gesture includes: an apparatus that is configured to detect that the portable electronic device is shaken.

With reference to a first possible implementation manner of the fourth aspect, in a third possible implementation manner of the fourth aspect, the apparatus that is configured to detect a first gesture includes: an apparatus that is configured to detect, on the touch-sensitive surface, that the second application interface element is slid.

With reference to a first possible implementation manner of the fourth aspect, in a fourth possible implementation manner of the fourth aspect, the apparatus that is configured to detect a first gesture includes: an apparatus that is configured to detect, on the touch-sensitive surface, that the first application interface element is slid.

With reference to a first possible implementation manner of the fourth aspect, in a fifth possible implementation manner of the fourth aspect, the apparatus that is configured to detect a first gesture includes: an apparatus that is configured to detect, on the touch-sensitive surface, that both the first application interface element and the second application interface element are dragged to be separated.

With reference to any one of the first to the fifth possible implementation manners of the fourth aspect, in a sixth possible implementation manner, the apparatus further includes: an apparatus that is configured to detect, on the touch-sensitive surface, that the second application interface element is touched and held.

With reference to any one of the first to the fifth possible implementation manners of the fourth aspect, in a seventh possible implementation manner, the apparatus further includes: an apparatus that is configured to detect that the portable electronic device is shaken.

With reference to any one of the first to the fifth possible implementation manners of the fourth aspect, in an eighth possible implementation manner, the apparatus further includes: an apparatus that is configured to detect, on the touch-sensitive surface, that the second application interface element is slid.

With reference to any one of the first to the fifth possible implementation manners of the fourth aspect, in a ninth possible implementation manner, the apparatus further includes: an apparatus that is configured to detect, on the touch-sensitive surface, that the first application interface element is slid.

With reference to any one of the first to the ninth possible implementation manners of the fourth aspect, in a tenth possible implementation manner, if there are at least two second application interface elements, the apparatus that is configured to display the second application interface element in a third area of the display screen to respond to the first gesture includes: an apparatus that is configured to: arrange the second application interface elements in a separation manner or in a combination manner, and display the second application interface elements in the third area.

With reference to the tenth possible implementation manner of the fourth aspect, in an eleventh possible implementation manner, the apparatus further includes: an apparatus that is configured to detect, on the touch-sensitive surface, that one second application interface element of the at least two second application interface elements is selected; and an apparatus that is configured to display, in a fourth area of the display screen, content of the generated new message that is corresponding to the first application program and indicated by the second application interface element.

With reference to the first possible implementation manner of the fourth aspect, in a twelfth possible implementation manner, the apparatus further includes: an apparatus that is configured to detect, on the touch-sensitive surface, that dragging the second application interface element is stopped; and an apparatus that is configured to display, in a fourth area of the display screen, content of the generated new message that is corresponding to the first application program and indicated by the second application interface element.

With reference to the fifth possible implementation manner of the fourth aspect, in a thirteenth possible implementation manner, the apparatus further includes: an apparatus that is configured to detect, on the touch-sensitive surface, that both dragging the first application interface element and dragging the second application interface element are stopped; and an apparatus that is configured to display, in a fourth area of the display screen, content of the generated new message that is corresponding to the first application program and indicated by the second application interface element.

With reference to any possible implementation manner of the eleventh possible implementation manner, the twelfth possible implementation manner, and the thirteenth possible implementation manner of the fourth aspect, in a fourteenth possible implementation manner, the apparatus further includes: an apparatus that is configured to detect, on the touch-sensitive surface, that a fifth area outside the fourth area is tapped; and an apparatus that is configured to stop displaying, in the fourth area of the display screen, the content of the generated new message that is corresponding to the first application program and indicated by the second application interface element.

According to a fifth aspect, an embodiment of the present invention provides a graphical user interface on a portable electronic device, where the portable electronic device includes a display, a memory, multiple application programs, and one or more processors that are configured to execute one or more programs stored in the memory, the display includes a touch-sensitive surface and a display screen, and the graphical user interface includes: an interface that is configured to display an application interface element, an interface that is configured to display that the application interface element may be moved, and an interface that is configured to display that the application interface element automatically moves to a folder; where the interface that is configured to display an application interface element includes: displaying a first application interface element in a first area of the display screen, where the first application interface element is corresponding to a first application program; displaying a second application interface element in a second area of the display screen, where the second application interface element indicates that a new message corresponding to the first application program is generated, and the second area and the first area at least partially overlap; and after a first gesture is detected, responding to the first gesture: the interface that is configured to display an application interface element stops displaying; and displaying the second application interface element in a third area of the display screen, where the third area and the first area do not overlap.

According to a sixth aspect, an embodiment of the present invention provides a method that is applied to a portable electronic device including a display and multiple application programs, where the display includes a touch-sensitive surface and a display screen, and the method includes: displaying a first application interface element in a first area of the display screen, where the first application interface element is corresponding to a first application program; displaying a second application interface element in a second area of the display screen, where the second application interface element indicates that a new message corresponding to the first application program is generated, and the second area and the first area at least partially overlap; detecting a first gesture; and displaying the second application interface element in a third area of the display screen to respond to the first gesture, where the third area and the first area do not overlap.

According to a seventh aspect, an embodiment of the present invention provides a method that is applied to a portable electronic device including a display and multiple application programs, where the display includes a touch-sensitive surface and a display screen, and the method includes: displaying a first application interface element in a first area of the display screen, where the first application interface element is corresponding to a first folder that includes at least two first application programs; displaying a second application interface element in a second area of the display screen, where the second application interface element indicates that at least one first application program in the first folder generates a new message corresponding to the at least one first application program, and the second area and the first area at least partially overlap; detecting a first gesture; and displaying the second application interface element in a third area of the display screen to respond to the first gesture, where the third area and the first area do not overlap.

With reference to a first possible implementation manner of the seventh aspect, in a first possible implementation manner of the seventh aspect, the detecting a first gesture includes: detecting, on the touch-sensitive surface, that the second application interface element is dragged to leave the first application interface element.

With reference to a first possible implementation manner of the seventh aspect, in a second possible implementation manner of the seventh aspect, the detecting a first gesture includes: detecting that the portable electronic device is shaken.

With reference to a first possible implementation manner of the seventh aspect, in a third possible implementation manner of the seventh aspect, the detecting a first gesture includes: detecting, on the touch-sensitive surface, that the second application interface element is slid.

With reference to a first possible implementation manner of the seventh aspect, in a fourth possible implementation manner of the seventh aspect, the detecting a first gesture includes: detecting, on the touch-sensitive surface, that the first application interface element is slid.

With reference to a first possible implementation manner of the seventh aspect, in a fifth possible implementation manner of the seventh aspect, the detecting a first gesture includes: detecting, on the touch-sensitive surface, that both the first application interface element and the second application interface element are dragged to be separated.

With reference to any one of the first to the fifth possible implementation manners of the seventh aspect, in a sixth possible implementation manner, before the detecting a first gesture, the method further includes: detecting, on the touch-sensitive surface, that the second application interface element is touched and held.

With reference to any one of the first to the fifth possible implementation manners of the seventh aspect, in a seventh possible implementation manner, before the detecting a first gesture, the method further includes: detecting that the portable electronic device is shaken.

With reference to any one of the first to the fifth possible implementation manners of the seventh aspect, in an eighth possible implementation manner, before the detecting a first gesture, the method further includes: detecting, on the touch-sensitive surface, that the second application interface element is slid.

With reference to any one of the first to the fifth possible implementation manners of the seventh aspect, in a ninth possible implementation manner, before the detecting a first gesture, the method further includes: detecting, on the touch-sensitive surface, that the first application interface element is slid.

With reference to any one of the first to the ninth possible implementation manners of the seventh aspect, in a tenth possible implementation manner, if there are at least two second application interface elements, the displaying the second application interface element in a third area of the display screen includes: arranging the second application interface elements in a separation manner or in a combination manner, and displaying the second application interface elements in the third area.

It may be learned from the foregoing solutions that according to the method and apparatus for processing a new message associated with an application that are provided in the embodiments of the present invention, a prompt indicating that an application generates a new message is separated from a graphical user interface object that represents the application, which may be convenient to independently manage the new message associated with the application, thereby saving system resources occupied by starting the application to process the new message. In addition, user operation experience may be enriched.

BRIEF DESCRIPTION OF DRAWINGS

To describe the technical solutions in the embodiments of the present invention or in the prior art more clearly, the following briefly describes the accompanying drawings required for describing the embodiments or the prior art.

FIG. 3A, FIG. 3B, and FIG. 3C are block diagrams of an exemplary electronic device having a display and a touch-sensitive surface according to some embodiments;

DESCRIPTION OF EMBODIMENTS

To make that the objectives, technical solutions, and advantages of the present invention are clearer, the following further describes the embodiments of the present invention in detail with reference to the accompanying drawings.

Generally, when a user wants to eliminate a new message of an application corresponding to an application interface element (generally by using a small red dot on an upper right corner of the application interface element), the user needs to tap the application interface element to start a program interface corresponding to the application interface element, and execute various operations. An entire elimination process has rather low efficiency, and the process is tedious. In addition, starting an application to perform an unread operation occupies a large quantity of system resources. For a user who has a slight obsessive-compulsive disorder, the conventional operation manner is more inconvenient.

The embodiments described in the following help a user separate, by using fewer operations, an application interface element on a graphical user interface and a new message of an application corresponding to the application interface element, so that the user can independently process the new message, thereby saving system resources occupied by starting the application associated with the new message each time the new message is to be processed. In this way, power is saved and user experience is enhanced.

Figure 4:
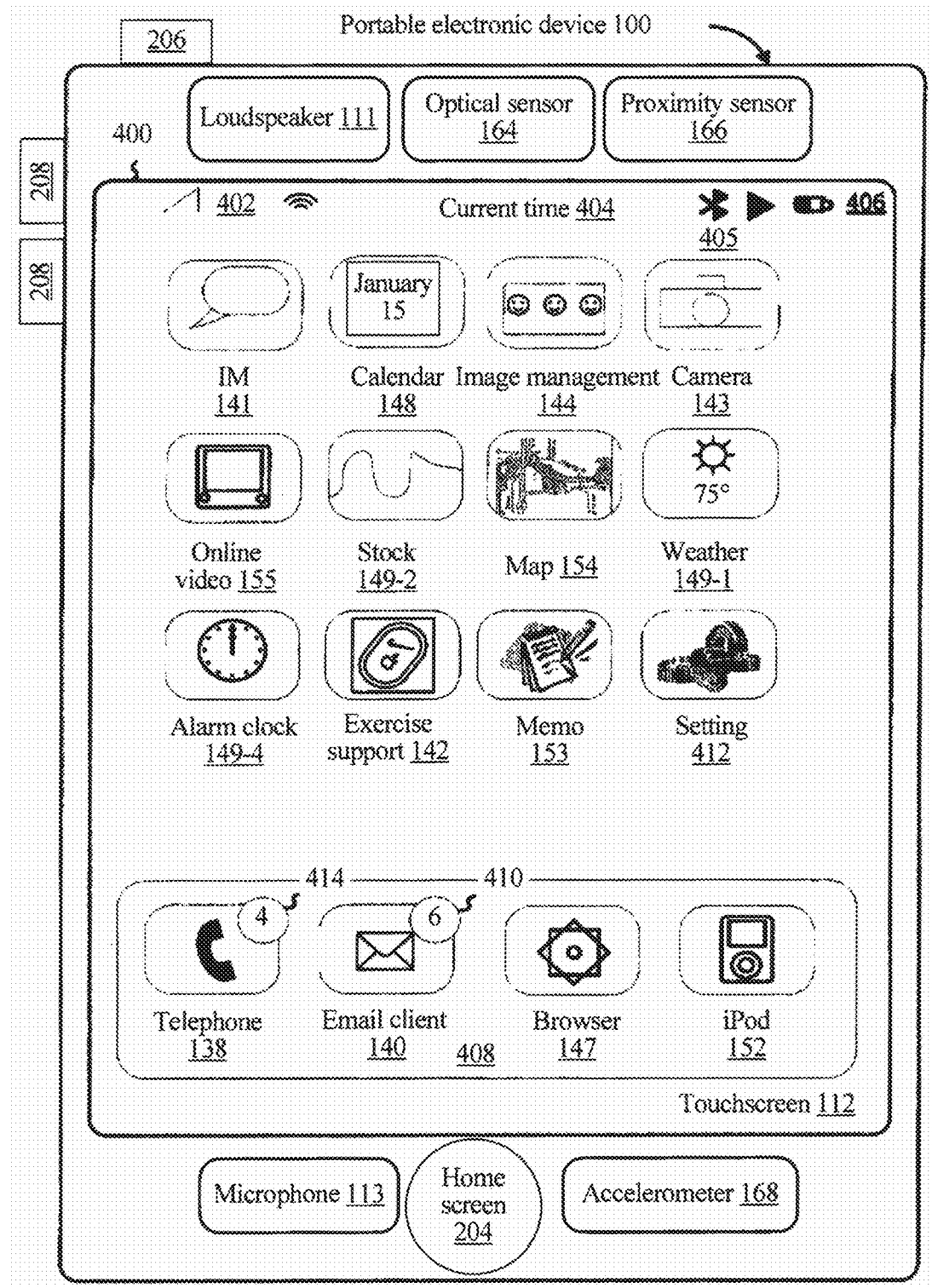
FIG. 4 shows an exemplary user interface, on a portable electronic device, used for an application program menu according to some embodiments.
Figure 5:
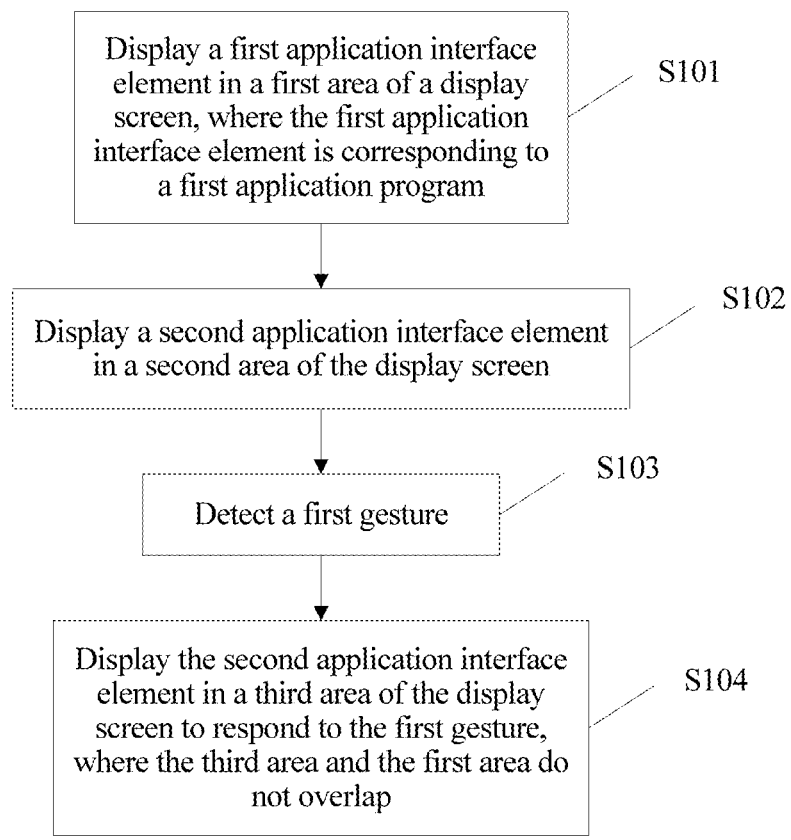
FIG. 5 is a flowchart of a method according to an embodiment of the present invention.
Figure 6:
FIG. 6 is an example diagram of a first operation in a method according to an embodiment of the present invention.
Figure 7:
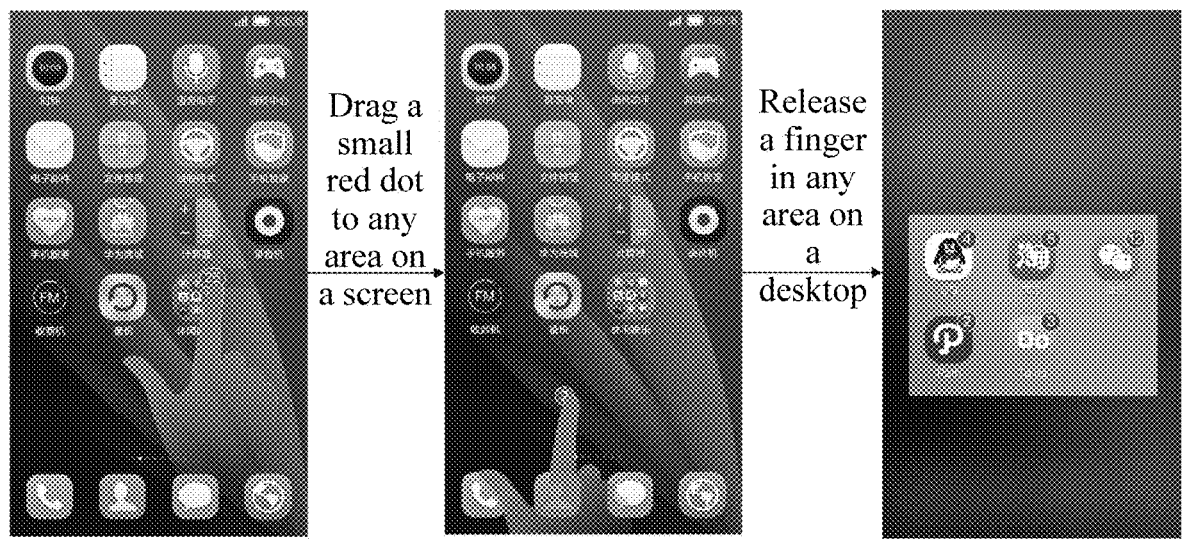
FIG. 7 is an example diagram of a second operation in a method according to an embodiment of the present invention.
Figure 8:
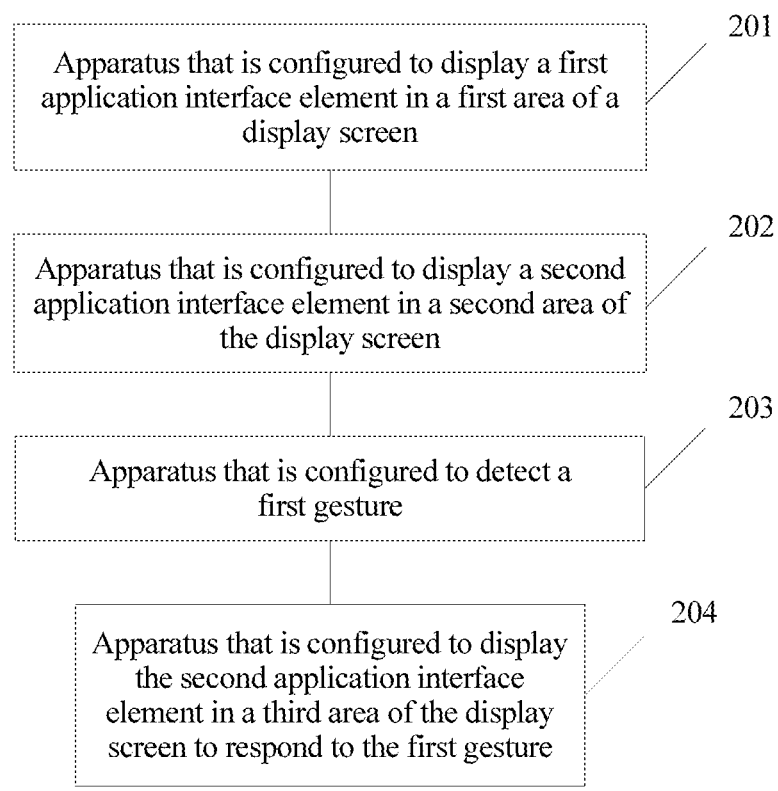
FIG. 8 is a block diagram of an information processing apparatus according to an embodiment of the present invention.

In the following, FIG. 1A, FIG. 1B, FIG. 1C, FIG. 1D, FIG. 2, FIG. 3A, FIG. 3B, and FIG. 3C provide a description of an exemplary device. FIG. 4, FIG. 6, and FIG. 7 show exemplary user interfaces that are configured to move an application interface element. FIG. 5 is a flowchart of a method for processing a new message associated with an application. FIG. 8 is a block diagram of an apparatus for processing a new message associated with an application. The user interfaces in FIG. 6 and FIG. 7 are used to illustrate processes and/or functions in FIG. 5 and FIG. 8.

Exemplary Device

Now the embodiments are described in detail, and examples of the embodiments are shown in the accompanying drawings. Many specific details are provided in the following detailed description, which facilitates a full understanding of the present invention. However, it is obvious to persons skilled in the art that the present invention may be implemented without the specific details. In other cases, well-known methods, processes, components, circuits, and networks are not described in detail, so that descriptions of the embodiments are easy to understand.

It should be further understood that although the terms such as "first" and "second" may be used to describe various elements in this specification, the elements should not be limited by the terms. The terms are merely used to distinguish one element from another element. For example, first contact may be named second contact, and similarly, second contact may be named first contact, without departing from the scope of the present invention. Both the first contact and the second contact are contact, but the first contact and the second contact may not be same contact; or in some scenarios, the first contact and the second contact may be same contact.

The terms used in the description of the present invention in this specification are merely for the purpose of describing specific embodiments, and are not intended to limit the present invention. The terms "one", "a" and "this" of singular forms used in this specification and the appended claims of the present invention are also intended to cover plural forms, unless otherwise specified in the context clearly. It should be further understood that, the term "and/or" used in this specification indicates and includes any or all possible combinations of one or more items in associated listed items. It should be further understood that the term "include" and/or "contain" used in this specification indicates presence of the described characteristics, integers, steps, operations, elements, and/or components, with presence or addition of one or more other characteristics, integers, steps, operations, elements, components, and/or their combinations not excluded.

According to the context, the term "if" used in this specification may be interpreted as a meaning of "when" or "after" or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

An electronic device, a user interface used for such a device, and an embodiment of an associated process in which such a device is used are described. In some embodiments, the device is a portable communications device, such as a mobile phone, that further includes another function such as a personal digital assistant and/or music player function. An exemplary embodiment of a portable electronic device includes but is not limited to a portable electronic device using iOS®, Android®, Microsoft®, or another operating system. Another portable electronic device such as a laptop computer or a tablet computer that has a touch-sensitive surface (for example, a touchscreen display and/or a touchpad) may alternatively be used. It should be further understood that in some embodiments, the device is not a portable communications device, but a desktop computer that has a touch-sensitive surface (for example, a touchscreen display and/or a touchpad).

An electronic device including a display and a touch-sensitive surface is described in the following. However, it should be understood that the electronic device may include one or more other physical user interface devices, such as a physical keyboard, a mouse, and/or a joystick.

The device generally supports various application programs, such as one or more of the following: a drawing application program, a presentation application program, a word processing application program, a web page creating application program, a disk editing application program, a spreadsheet application program, a game application program, a telephone application program, a video conference application program, an email application program, an instant message application program, an exercise support application program, a photograph management application program, a digital camera application program, a digital video camera application program, a network browsing application program, a digital music player application program, or a digital video player application program.

Various application programs that can be executed on the device may use at least one common physical user interface device, such as a touch-sensitive surface. One or more functions of the touch-sensitive surface and corresponding information displayed on the device may be adjusted and/or changed from an application program to a next application program and/or may be adjusted and/or changed in a corresponding application program. In this way, a common physical architecture (for example, a touch-sensitive surface) of the device may support the various application programs by using a user interface that is intuitive and clear for a user.

Figure 1A:
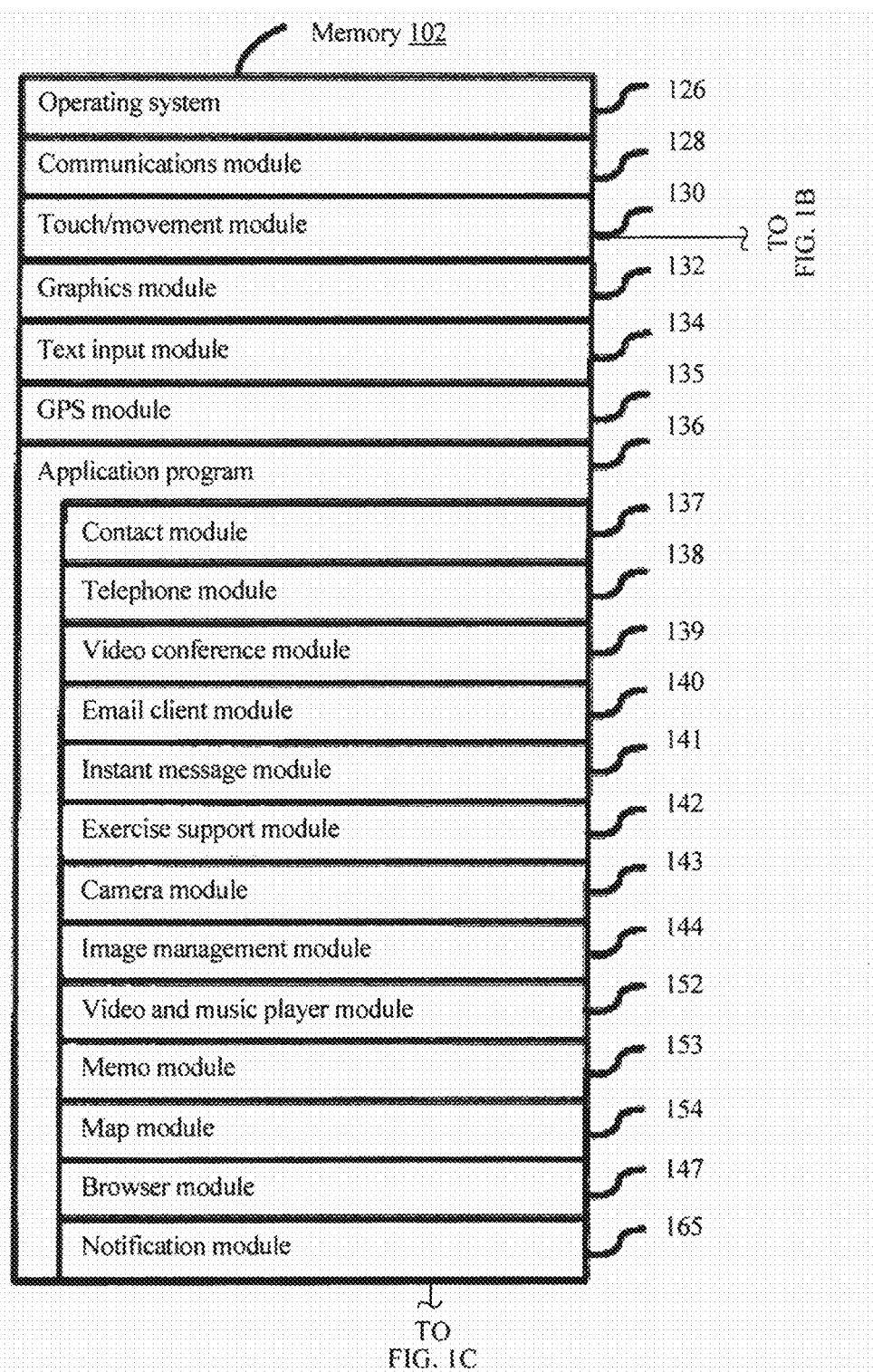
FIG. 1A, FIG. 1B, and FIG. 1C are block diagrams of a portable electronic device having a touch-sensitive display according to some embodiments.
Figure 1B:
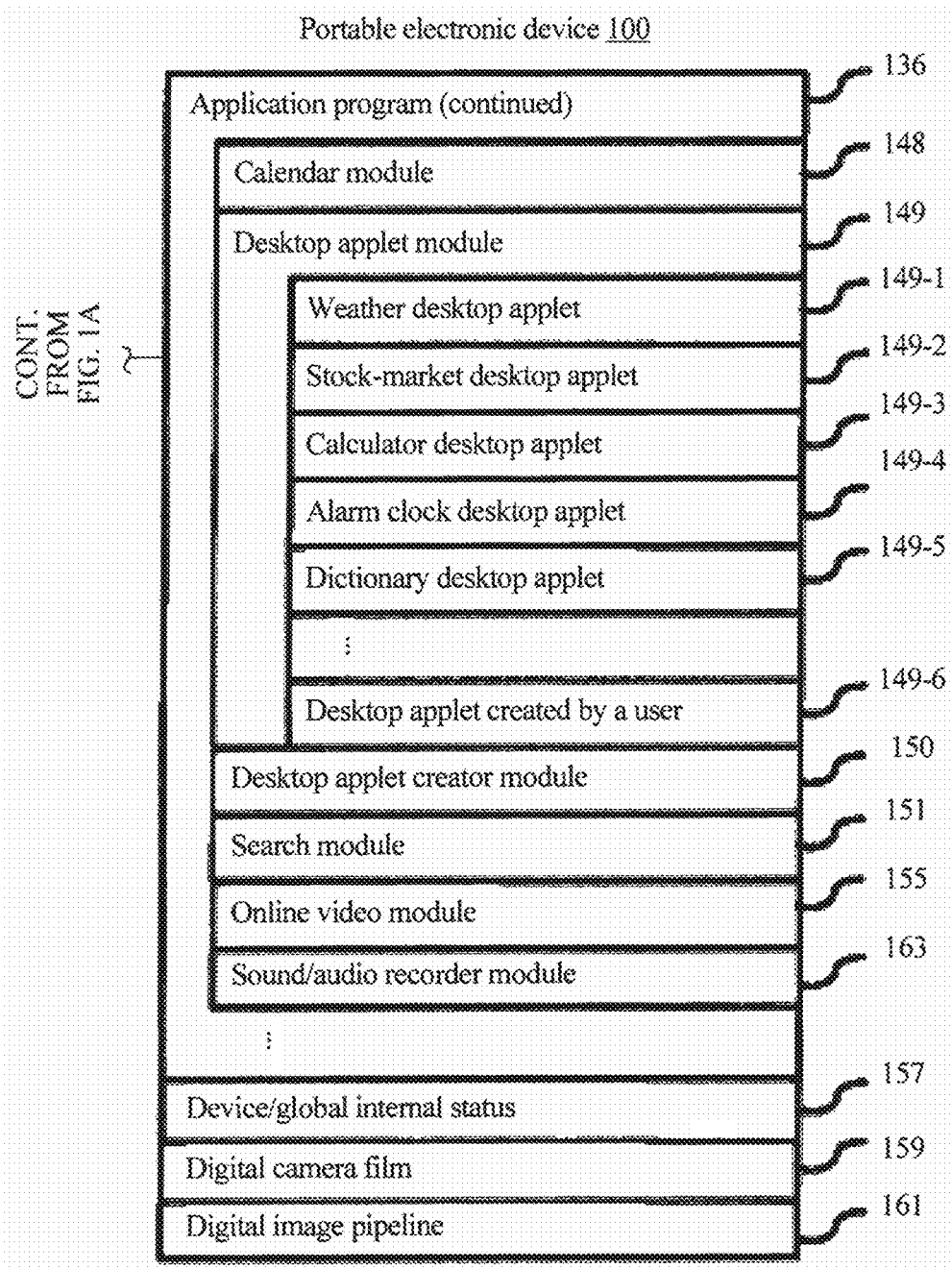
Figure 1C:
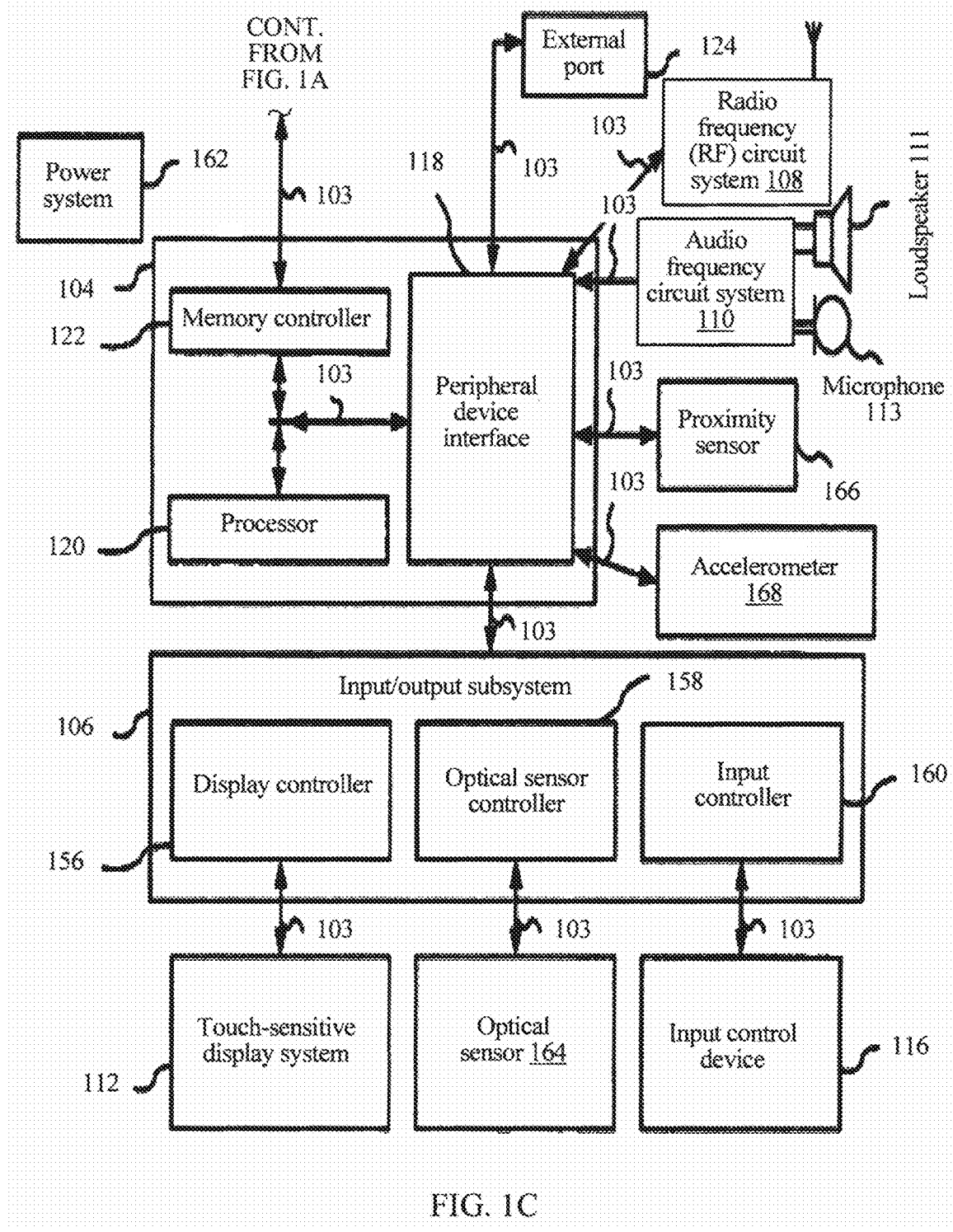

Now a description is provided for an embodiment of a portable device having a touch-sensitive display. FIG. 1A, FIG. 1B, and FIG. 1C are block diagrams of a portable electronic device 100 having a touch-sensitive display 112 according to some embodiments. Sometimes, for convenience, the touch-sensitive display 112 is referred to as a "touchscreen", may be referred to as or called a touch-sensitive display system, or may be referred to as a display system having a touch-sensitive surface (touch-sensitive surface) and a display screen (display). The device 100 may include a memory 102 (the memory 102 may include one or more computer readable storage media), a memory controller 122, one or more processing units (CPU) 120, a peripheral device interface 118, an RF circuit system 108, an audio frequency circuit system 110, a loudspeaker 111, a microphone 113, an input/output (I/O) subsystem 106, another input control device 116, and an external port 124. The device 100 may include one or more optical sensors 164. These components may perform communication by using one or more communications buses or signal cables 103.

It should be understood that the device 100 is merely an example of a portable electronic device, and the device 100 may have components more or fewer than those shown in the figure, may combine two or more components, or may have different configurations or arrangements of the components. The components shown in FIG. 1A to FIG. 1C may be implemented by hardware or software, or a combination of hardware and software, and include one or more signal processing and/or application-specific integrated circuits.

The memory 102 may include a high-speed random access memory, and may further include a non-volatile memory, for example, one or more magnetic disk storage devices, flash memory devices, or other non-volatile solid-state storage devices. Accessing the memory 102 by other components (such as the CPU 120 and the peripheral device interface 118) of the device 100 may be controlled by the memory controller 122.

The peripheral device interface 118 may be configured to couple input and output peripheral devices of the device to the CPU 120 and the memory 102. The one or more processors 120 run or execute various software programs and/or instruction sets stored in the memory 102, to execute various functions of the device 100 and process data. In some embodiments, the one or more processors 120 include an image signal processor and a dual-core or multi-core processor.

In some embodiments, the peripheral device interface 118, the CPU 120, and the memory controller 122 may be implemented on a single chip, for example, a chip 104. In some other embodiments, the peripheral device interface 118, the CPU 120, and the memory controller 122 may be implemented on independent chips.

The RF (radio frequency) circuit system 108 receives and transmits an RF signal, which is also called an electromagnetic signal. The RF circuit system 108 converts an electrical signal into an electromagnetic signal or converts an electromagnetic signal into an electrical signal, and communicates with a communications network and another communications device by using the electromagnetic signal. The RF circuit system 108 may include a well-known circuit system used to execute these functions, includes but is not limited to an antenna system, an RF transceiver, one or more amplifiers, a tuner, one or more oscillators, a digital signal processor, a codec chip set, a subscriber identity module (SIM) card, a memory, or the like. The RF circuit system 108 may communicate with a network and another device by means of wireless communication. The network is, for example, the Internet (also referred to as the World Wide Web (WWW)), an intranet, and/or a wireless network (for example, a cellular phone network, a wireless local area network (LAN), and/or a metropolitan area network (MAN)). The wireless communication may use any type in various communications standards, protocols, or technologies, which includes but is not limited to a Global System for Mobile Communications (GSM), an Enhanced Data GSM Environment (EDGE), High Speed Downlink Packet Access (HSDPA), High Speed Uplink Packet Access (HSUPA), Wideband Code Division Multiple Access (W-CDMA), Code Division Multiple Access (CDMA), Time Division Multiple Access (TDMA), Bluetooth, Wireless Fidelity (WI-Fi) (for example, IEEE 802.11a, IEEE 802.11b, IEEE 802.11g, and/or IEEE 802.11n), the Voice over Internet Protocol (VoIP), Wi-MAX, the email protocol (for example, the Internet Message Access Protocol (IMAP) and/or the Post Office Protocol (POP)), an instant message (for example, the Extensible Messaging and Presence Protocol (XMPP), the Session Initiation Protocol for Instant Messaging and Presence Leveraging Extensions (SIMPLE), Instant Messaging and Presence Service (IMPS)), and/or Short Message Service (SMS), or any other proper communications protocols, including a communications protocol that is not developed when this document is filed.

The audio frequency circuit system 110, the loudspeaker 111, and the microphone 113 provide an audio interface between a user and the device 100. The audio frequency circuit system 110 receives audio data from the peripheral device interface 118, converts the audio data into an electrical signal, and transmits the electrical signal to the loudspeaker 111. The loudspeaker 111 converts the electrical signal into a sound wave that people can hear. The audio frequency circuit system 110 further receives an electrical signal obtained by the microphone 113 by means of conversion according to a sound wave. The audio frequency circuit system 110 converts the electrical signal into audio data, and transmits the audio data to the peripheral device interface 118 for processing. The audio data may be retrieved from and/or transmitted to the memory 102 and/or the RF circuit system 108 by the peripheral device interface 118. In some embodiments, the audio frequency circuit system 110 further includes a headset jack (for example, 212 in FIG. 2). The headset jack provides an interface between the audio frequency circuit system 110 and a removable audio input/output peripheral device. The peripheral device is, for example, an earphone only for output or a headset both for output (for example, a single-earpiece or two-earpiece earphone) and input (for example, a microphone).

The I/O subsystem 106 couples input/output peripheral devices, such as the touchscreen 112 and the another input control device 116, on the device 100 to the peripheral device interface 118. The I/O subsystem 106 may include a display controller 156 and one or more input controllers 160 used by the another input control device. The one or more input controllers 160 receive an electrical signal from the another input control device 116 or transmit an electrical signal to the another input control device 116. The another input control device 116 may include a physical button (for example, a push button or a rocker button), a dial, a slider switch, a joystick, a click wheel, and the like. In some optional embodiments, the input controller 160 may be coupled to (or may not be coupled to) any one of the following: a keyboard, an infrared port, a USB port, or a pointer device such as a mouse. The one or more buttons (for example, 208 in FIG. 2) may include an up/down button that is configured to control volume of the loudspeaker 111 and/or the microphone 113. The one or more buttons may include a push button (for example, 206 in FIG. 2).

The touch-sensitive display 112 provides an input interface and an output interface between the device and the user. The display controller 156 receives an electrical signal from the touchscreen 112 and/or transmits an electrical signal to the touchscreen 112. The touchscreen 112 displays visual output to the user. The visual output may include graphics, a text, an icon, a video, and any combination thereof (collectively referred to as "graphics"). In some embodiments, some visual output or all visual output may be corresponding to a user interface object.

The touchscreen 112 has a touch-sensitive surface that receives input from the user based on touch and/or tactile contact, and a sensor or a sensor group. The touchscreen 112 and the display controller 156 (together with any associated module and/or instruction set in the memory 102) detect contact (and any movement or disconnection of the contact) on the touchscreen 112, and convert the detected contact into interaction with a user interface object (for example, one or more softkeys, icons, web pages, or images) displayed on the touchscreen 112. In an exemplary embodiment, a contact point between the touchscreen 112 and the user is corresponding to a finger of the user.

The touchscreen 112 may use an LCD (liquid crystal display) technology, an LPD (light emitting polymer display) technology, or an LED (light emitting diode) technology, or may use another display technology in another embodiment. The touchscreen 112 and the display controller 156 may detect contact and any movement or disconnection of the contact by using any technology of various touch sensing technologies that are currently known or will be developed in the future and another proximity sensor array, or another element that is configured to determine one or more points in contact with the touchscreen 112. The various touch sensing technologies include but are not limited to capacitive, resistive, infrared, or surface acoustic wave technologies. In an exemplary embodiment, a projected mutual capacitance sensing technology is used.

The touchscreen 112 may have a video resolution exceeding 100 dpi. In some embodiments, the touchscreen has a video resolution of approximately 160 dpi. The user may touch the touchscreen 112 by using any suitable object or accessory such as a stylus or a finger. In some embodiments, a user interface is designed to mainly work with finger-based contact and a gesture. Precision of finger-based input may be lower than that of stylus-based input because a contact area of a finger on the touchscreen is larger. In some embodiments, the device translates finger-based rough input into a precise pointer/cursor position or command, to execute an action expected by the user.

In some embodiments, in addition to the touchscreen, the device 100 may include a touchpad (not shown) configured to activate or deactivate a specific function. In some embodiments, the touchpad is a touch-sensitive area of the device. Different from the touchscreen, the touch-sensitive area does not display visual output. The touchpad may be a touch-sensitive surface that is separate from the touchscreen 112, or may be an extension part of a touch-sensitive surface formed by the touchscreen.

The device 100 further includes a power system 162 used to supply power to various components. The power system 162 may include a power management system, one or more power sources (for example, a battery and an alternating current (AC)), a recharging system, a power failure detection circuit, a power converter or inverter, a power status indicator (for example, a light emitting diode (LED)), and any other components associated with power generation, management, and distribution in the portable device.

The device 100 may further include one or more optical sensors 164. FIG. 1A-a TO FIG. 1A-c shows an optical sensor coupled to an optical sensor controller 158 in the I/O subsystem 106. The optical sensor 164 may include a charge-coupled device (CCD) or a complementary metal-oxide-semiconductor (CMOS) phototransistor. The optical sensor 164 receives, from an environment, light projected by using one or more lenses, and converts the light into data that indicates an image. In combination with an imaging module 143 (also referred to as a camera module), the optical sensor 164 may capture a still image or a video. In some embodiments, one or more optical sensors are disposed on the rear of the device 100, and is opposite to the touchscreen display 112 on the front of the device, so that the touchscreen display may be used as a viewfinder that is configured to collect a still image and/or a video image. In some embodiments, one or more other optical sensors are disposed on the front of the device, so that when a user watches another participant of a video conference on the touchscreen display, an image of the user may be obtained to be used for the video conference.

The device 100 may further include one or more proximity sensors 166. FIG. 1A-a TO FIG. 1A-c shows the proximity sensor 166 coupled to the peripheral device interface 118. In another option, the proximity sensor 166 may be coupled to the input controller 160 in the I/O subsystem 106. In some embodiments, when an electronic device is placed near an ear of a user (for example, when the user is making a telephone call), the proximity sensor closes and the touchscreen 112 is disabled.

The device 100 may further include one or more accelerometers 168. FIG. 1A TO FIG. 1C shows the accelerometer 168 coupled to the peripheral device interface 118. In another option, the accelerometer 168 may be coupled to the input controller 160 in the I/O subsystem 106. In some embodiments, based on an analysis of data received from the one or more accelerometers, information is displayed on the touchscreen display in a portrait view or in a landscape view. Optionally, in addition to the accelerometer 168, the device 100 further includes a magnetometer (not shown) and a GPS (or GLONASS or BeiDou or another global navigation system) receiver (not shown), which are configured to obtain information about a position and an orientation (for example, portrait or landscape) of the device 100.

In some embodiments, software components stored in the memory 102 include an operating system 126, a communications module (or an instruction set) 128, a touch/movement module (or an instruction set) 130, a graphics module (or an instruction set) 132, a text input module (or an instruction set) 134, a global positioning system (GPS) module (or an instruction set) 135, and an application program (or an instruction set) 136. In addition, in some embodiments, as shown in FIG. 1A TO FIG. 1C and FIG. 3A TO FIG. 3C, the memory 102 stores a device/global internal status 157. The device/global internal status 157 includes one or more of the following: an active application program status, used to indicate application programs (if any) that are currently active; a display status, used to indicate application programs, views, or other information that occupy areas of the touchscreen display 112; a sensor status, including information obtained from sensors and the input control device 116 of the device; or information about a position and a posture of the device.

The operating system 126 (for example, Darwin, RTXC, LINUX, UNIX, OS X, WINDOWS, ANDROID, or an embedded operating system (such as Vx Works)) includes various software components and/or drivers configured to control and manage a general system task (for example, memory management, storage device control, or power management), and facilitates communication between various hardware components and software components. In addition, in some embodiments, the memory 102 stores a digital camera film 159 and a digital image pipeline 161.

The communications module 128 helps the device 100 communicate with another device by using one or more external ports 124, and further includes various software components that are configured to process data received by the RF circuit system 108 and/or the external port 124. The external port 124 (for example, a Universal Serial Bus (USB) or a FireWire) is suitable for being directly coupled to another device or being indirectly coupled to another device by using a network (for example, the Internet or a wireless LAN). In some embodiments, the external port is a multi-pin (for example, 30-pin) connector that is the same as or similar to a 30-pin connector used on an iPod (a trademark of Apple Inc.) device and/or that is compatible with the external port.

The touch/movement module 130 may detect contact with the touchscreen 112 (in combination with the display controller 156) and another touch-sensitive device (for example, a touchpad or a physical click wheel). The touch/movement module 130 includes multiple software components that are configured to execute various operations related to contact detection, for example, determining whether contact occurs (for example, detecting a finger press event), determining whether a contact movement exists and tracking the movement on the entire touch-sensitive surface (for example, detecting a one-finger or multi-finger drag event), and determining whether contact terminates (for example, detecting a finger raising event or a contact disconnection). The touch/movement module 130 receives contact data from the touch-sensitive surface. Determining a movement of a contact point may include determining a speed (a magnitude), a velocity (a magnitude and a direction), and/or acceleration (a magnitude and/or a change of a direction) of the contact point. The movement of the contact point is indicated by a series of contact data. These operations may be applied to single point contact (for example, one-finger contact) or multipoint contact at the same time (for example, "multi-touch"/multi-finger contact). In some embodiments, the touch/movement module 130 and the display controller 156 detect contact on the touchpad.

The touch/movement module 130 may detect gesture input of the user. Different gestures on the touch-sensitive surface have different contact patterns. Therefore, a gesture may be detected by detecting a specific contact pattern. For example, detecting a single-finger tap gesture includes detecting a finger press event and then detecting a finger raising (leaving) event at a same location (or a basically same location) of the finger press event (for example, at an icon location). For another example, detecting a finger swipe gesture on the touch-sensitive surface includes detecting a finger press event, detecting a one-finger or multi-finger drag event, and subsequently detecting a finger raising (leaving) event.

The graphics module 132 includes multiple known software components that are configured to render and display graphics on the touchscreen 112 or another display. The multiple known software components include a component configured to change strength of displayed graphics. As described in this specification, the term "graphics" includes any object that can be displayed to the user, and includes but is not limited to a text, a web page, an icon (such as a user interface object including a softkey), a digital image, a video, an animation, or the like.

In some embodiments, the graphics module 132 stores data that needs to be used, to indicate graphics. Corresponding code may be allocated to each of graphics. The graphics module 132 receives, from an application program and the like, one or more pieces of code of graphics specified to be displayed, further receives coordinate data and other graphics attribute data together in a necessary case, and then generates screen image data to output the data to the display controller 156.

The text input module 134 that can be used as a component of the graphics module 132 provides a soft keyboard that is configured to input a text in various application programs (for example, a contact 137, an email 140, an instant message 141, a browser 147, and any other application programs that need text input).

The GPS module 135 determines a position of the device, and provides the information for use in various application programs (for example, provides the information to a telephone 138 for position-based dialing, provides the information to a camera 143 as picture/video metadata, and provides the information to an application program, such as a weather desktop applet, a local yellow-page desktop applet, and a map/navigation desktop applet, that provides a position-based service).

An application program 136 may include the following modules (or instruction sets), or a subgroup or a superset of the modules:

a contact module 137 (sometimes also referred to as an address book or a contact list);
a telephone module 138;
a video conference module 139;
an email client module 140;
an instant message (IM) module 141;
an exercise support module 142;
a camera module 143 used for a still image and/or a video image;
an image management module 144;
a browser module 147;
a calendar module 148;
a desktop applet module 149, which may include one or more of the following: a weather desktop applet 149-1, a stock-market desktop applet 149-2, a calculator desktop applet 149-3, an alarm clock desktop applet 149-4, a dictionary desktop applet 149-5, another desktop applet obtained by the user, or a desktop applet 149-6 created by the user;
a desktop applet creator module 150 that is configured to generate the desktop applet 149-6 created by the user;
a search module 151;
a video and music player module 152, which may include a video player module and a music player module;
a memo module 153;
a map module 154;
an online video module 155;
a sound/audio recorder module 163; and/or
a notification module 165.

Other examples of the application program 136 that may be stored in the memory 102 include another word processing application program, another image editing application program, a drawing application program, a presentation application program, an application program started by JAVA, encryption, digital rights management, voice recognition, and sound reproduction.

Figure 1D:
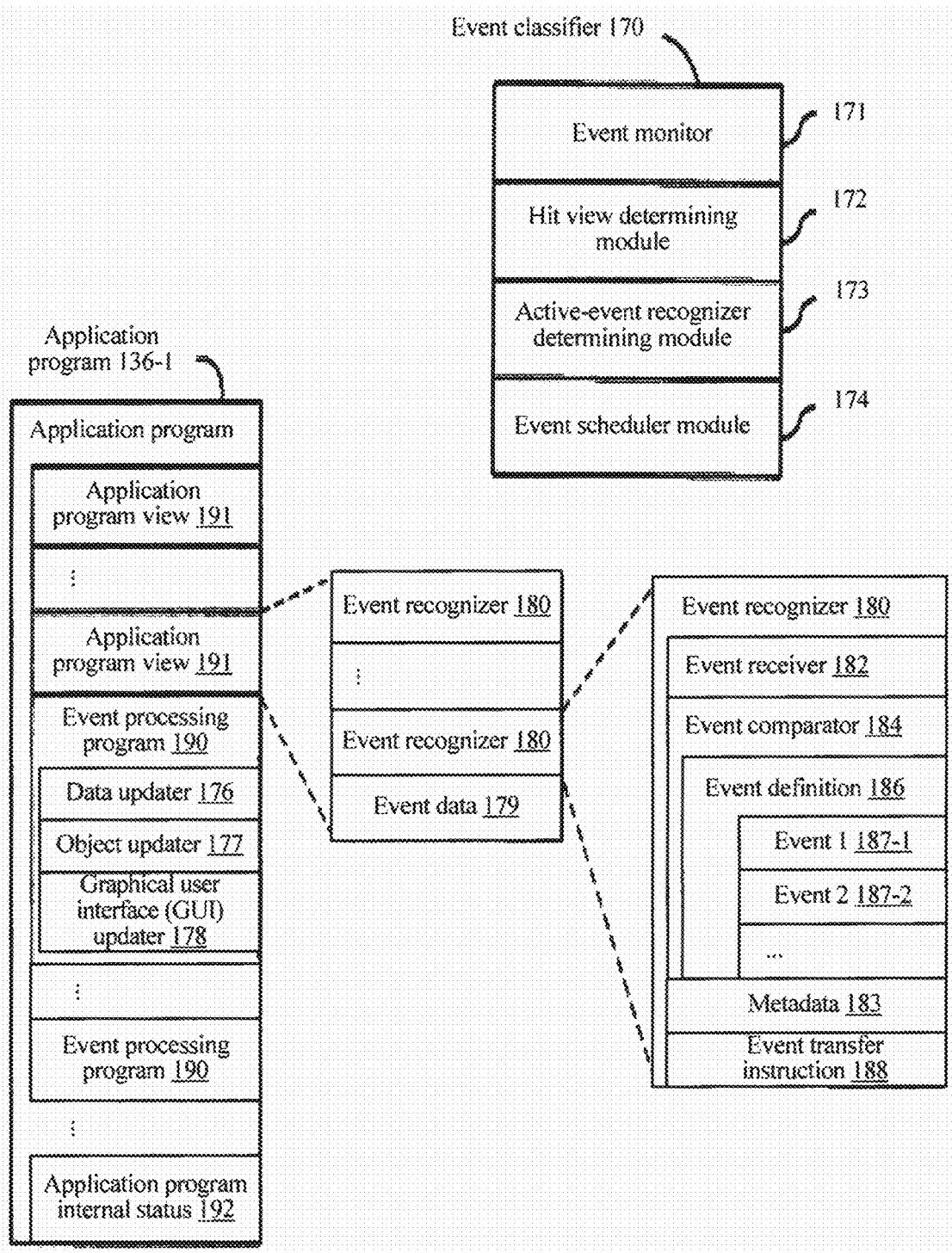
FIG. 1D is a block diagram of exemplary components configured for event processing according to some embodiments.

In combination with the touchscreen 112, the display controller 156, the touch module 130, the graphics module 132, and the text input module 134, the contact module 137 may be configured to manage an address book or a contact list (which is stored, for example, in an application program internal status 192 of the contact module 137 in the memory 102 of FIG. 1D). Managing the address book or the contact list includes adding a name to the address book; deleting a name from the address book; associating a telephone number, an email address, an actual address, or other information with a name; associating an image with a name; sorting and classifying names; providing a telephone number or an email address to initiate and/or facilitate communication performed by using the telephone 138, the video conference 139, the email 140, or the IM 141; and the like.

In combination with the RF circuit system 108, the audio frequency circuit system 110, the loudspeaker 111, the microphone 113, the touchscreen 112, the display controller 156, the touch module 130, the graphics module 132, and the text input module 134, the telephone module 138 may be configured to: input a character sequence corresponding to a telephone number, access one or more telephone numbers in the address book 137, modify an input telephone number, dial a corresponding telephone number, communicate by telephone, and disconnect or hang up the call when the call is complete. As described above, the wireless communication may use any one of multiple communications standards, protocols, or technologies.

In combination with the RF circuit system 108, the audio frequency circuit system 110, the loudspeaker 111, the microphone 113, the touchscreen 112, the display controller 156, the optical sensor 164, the optical sensor controller 158, the touch module 130, the graphics module 132, the text input module 134, the contact list 137, and the telephone module 138, the video conference module 139 includes executable instructions used to initiate, perform, and terminate a video conference between the user and one or more other participants according to user instructions.

In combination with the RF circuit system 108, the touchscreen 112, the display controller 156, the touch module 130, the graphics module 132, and the text input module 134, the email client module 140 includes executable instructions used to create, send, receive, and manage an email in response to user instructions. In combination with the image management module 144, the email client module 140 can easily create and send an email having a still image or a video image that is photographed by the camera module 143.

In combination with the RF circuit system 108, the touchscreen 112, the display controller 156, the touch module 130, the graphics module 132, and the text input module 134, the instant message module 141 includes executable instructions used to: input a character sequence corresponding to an instant message, modify a previously input character, transmit a corresponding instant message (for example, use the Short Message Service (SMS) or Multimedia Messaging Service (MMS) protocol for a telephone-based instant message, or use XMPP, SIMPLE, or IMPS for an Internet-based instant message), receive an instant message, and check the received instant message. In some embodiments, the transmitted and/or received instant message may include graphics, a photograph, an audio file, a video file, and/or another attachment supported in MMS and/or Enhanced Messaging Service (EMS). As described in this specification, the "instant message" refers to a telephone-based message (for example, a message sent by using SMS or MMS) and an Internet-based message (for example, a message sent by using XMPP, SIMPLE, or IMPS).

In combination with the RF circuit system 108, the touchscreen 112, the display controller 156, the touch module 130, the graphics module 132, the text input module 134, the GPS module 135, the map module 154, and the music player module 146, the exercise support module 142 includes executable instructions used to: create an exercise (for example, having a time, a distance, and/or a calorie consuming target); communicate with an exercise sensor (an athletic facility); receive data of the exercise sensor; calibrate a sensor used for exercise monitoring; select and play music for the exercise; and display, store, and transmit exercise data.

In combination with the touchscreen 112, the display controller 156, the optical sensor 164, the optical sensor controller 158, the touch module 130, the graphics module 132, the digital image pipeline 161 (the digital image pipeline 161 converts raw data from the optical sensor into a final image or video), and the image management module 144, the camera module 143 includes executable instructions used to: capture a still image or a video (including a video stream), store the still image or the video in the memory 102 (for example, in the digital camera film 159), and modify a characteristic of the still image or the video, or delete the still image or the video from the memory 102 (for example, from the digital camera film 159).

In combination with the touchscreen 112, the display controller 156, the touch module 130, the graphics module 132, the text input module 134, and the camera module 143, the image management module 144 includes executable instructions used to: arrange, modify (for example, edit), or operate and control in another manner, tag, delete, present (for example, in a digital slideshow or album), and store a still image and/or a video image (including a still image and/or a video image that is stored in the camera film 159).

In combination with the RF circuit system 108, the touchscreen 112, the display system controller 156, the touch module 130, the graphics module 132, and the text input module 134, the browser module 147 includes an executable instruction used to browse the Internet (including searching for, linking to, receiving, displaying a web page or a part of the web page, and linking to an attachment of the web page and another file) according to a user instruction.

In combination with the RF circuit system 108, the touchscreen 112, the display system controller 156, the touch module 130, the graphics module 132, the text input module 134, the email client module 140, and the browser module 147, the calendar module 148 includes executable instructions used to: according to user instructions, create, display, modify, and store a calendar and data associated with the calendar (for example, a calendar entry or a to-do task list).

In combination with the RF circuit system 108, the touchscreen 112, the display system controller 156, the touch module 130, the graphics module 132, the text input module 134, and the browser module 147, the desktop applet module 149 is a miniature application program that may be downloaded and used by the user (for example, the weather desktop applet 149-1, the stock-market desktop applet 149-2, the calculator desktop applet 149-3, the alarm clock desktop applet 149-4, and the dictionary desktop applet 149-5) or a miniature application program that may be created by the user (for example, the desktop applet 149-6 created by the user). In some embodiments, desktop applets include an HTML (Hypertext Markup Language) file, a CSS (cascading style sheet) file, and a JavaScript file. In some embodiments, desktop applets include an XML (Extensible Markup Language) file and a JavaScript file (for example, a Yahoo! desktop applet).

In combination with the RF circuit system 108, the touchscreen 112, the display system controller 156, the touch module 130, the graphics module 132, the text input module 134, and the browser module 147, the desktop applet creator module 150 may be used by the user to create a desktop applet (for example, to transfer a user-specified part of a web page to the desktop applet).

In combination with the touchscreen 112, the display system controller 156, the touch module 130, the graphics module 132, and the text input module 134, the search module 151 includes an executable instruction that is used to search, according to a user instruction, the memory 102 for a text, music, a sound, an image, a video, and/or another file, where the foregoing searched items match one or more search standards (for example, one or more search terms specified by the user).

In combination with the touchscreen 112, the display system controller 156, the touch module 130, the graphics module 132, the audio frequency circuit system 110, the loudspeaker 111, the RF circuit system 108, and the browser module 147, the video and music player module 152 includes an executable instruction that allows the user to download and play back recorded music and another sound file that are stored in one or more file formats (such as an MP3 or AAC file), and an executable instruction used to display, present, or play back a video in another manner (for example, on the touchscreen 112 or on an external display connected by using the external port 124). In some embodiments, the device 100 may have functionality of an MP3 player.

In combination with the touchscreen 112, the display controller 156, the touch module 130, the graphics module 132, and the text input module 134, the memo module 153 includes executable instructions used to create and manage a memo, a to-do task list, and the like according to user instructions.

In combination with the RF circuit system 108, the touchscreen 112, the display system controller 156, the touch module 130, the graphics module 132, the text input module 134, the GPS module 135, and the browser module 147, the map module 154 may be configured to: according to user instructions, receive, display, modify, and store a map and data associated with the map (for example, a driving route, data of a shop and another point of interest at a specific position or nearby, and other position-based data).

In combination with the touchscreen 112, the display system controller 156, the touch module 130, the graphics module 132, the audio frequency circuit system 110, the loudspeaker 111, the RF circuit system 108, the text input module 134, the email client module 140, and the browser module 147, the online video module 155 includes instructions that allow the user to access, browse, receive (for example, receive and/or download, in a streaming manner), play back (for example, on the touchscreen or on an external display connected by using the external port 124), manage, in another manner, online videos in one or more file formats (such as H.264), and send an email having a link to a specific online video. In some embodiments, the instant message module 141 instead of the email client module 140 is configured to send a link that is to a specific online video.

In combination with the touchscreen 112, the display system controller 156, the touch module 130, the graphics module 132, the audio frequency circuit system 110, the loudspeaker 111, and the microphone 113, the sound/audio recorder module 163 includes an executable instruction that allows the user to record, in one or more file formats (such as an MP3 or AAC file), audio (for example, a sound) and an executable instruction used to present or play back, in another manner, a recorded audio file.

In combination with the touchscreen 112, the display system controller 156, the touch module 130, and the graphics module 132, the notification module 165 includes an executable instruction for displaying notification or warning (such as an incoming message, an incoming call, a calendar event reminder, or an application program event) on the touchscreen 112.

Each of the foregoing modules and application programs is corresponding to a set of executable instructions used to execute the foregoing one or more functions and the method (for example, a method implemented by a computer and another information processing method that are described in this specification) described in this application. The modules (that is, instruction sets) do not need to be implemented as separate software programs, processes, or modules. In addition, various subgroups of the modules may be combined or rearranged in another manner in various embodiments. In some embodiments, the memory 102 may store a subgroup of the foregoing modules and data structures. In addition, the memory 102 may store another module and data structure that are not described above.

In some embodiments, the device 100 is such a device, that is, operations of a group of functions predefined on the device are executed by using only a touchscreen and/or a touchpad. A quantity of physical input control devices (such as a push button or a dial) on the device 100 may be reduced by using the touchscreen and/or the touchpad as a main input control device configured for operations of the device 100.

The group of predefined functions that can only be executed by using the touchscreen and/or the touchpad include navigation between user interfaces. In some embodiments, when the touchpad is touched by the user, the device 100 navigates, to a primary menu, a main menu, or a root menu, from any user interface that may be displayed on the device 100. In such embodiments, the touchpad may be referred to as a "menu button". In some other embodiments, a menu button may be a physical push button or another physical input control device but not the touchpad.

FIG. 1D is a block diagram of exemplary components configured for event processing according to some embodiments. In some embodiments, the memory 102 (in FIG. 1A TO FIG. 1C) or a memory 370 (in FIG. 3A TO FIG. 3C) includes an event classifier 170 (for example, in the operating system 126) and a corresponding application program 136-1 (for example, any application program of the foregoing application programs 137 to 151, 155, and 380 to 390).

The event classifier 170 receives event information and determines the application program 136-1 to which the event information needs to be transferred and an application program view 191 of the application program 136-1. The event classifier 170 includes an event monitor 171 and an event scheduler module 174. In some embodiments, the application program 136-1 includes an application program internal status 192. The application program internal status 192 indicates a current application program view displayed on the touch-sensitive display 112 when the application program is active or is being executed. In some embodiments, the device/global internal status 157 is used by the event classifier 170 to determine an application program (application programs) that is currently active, and the application program internal status 192 is used by the event classifier 170 to determine the application program view 191 to which the event information needs to be transferred.

In some embodiments, the application program internal status 192 includes other information, such as one or more of the following: resumption information to be used when the application program 136-1 resumes being executed, user interface status information indicative of information that is being displayed by the application program 136-1 or information ready to be displayed by the application program 136-1, a status queue used to enable the user to return to a previous state or view of the application program 136-1, or a repetition/revocation queue of a previous action taken by the user.

The event monitor 171 receives event information from the peripheral device interface 118. The event information includes information about a sub-event (for example, a user touch on the touch-sensitive display 112 is used as a part of a multi-touch gesture). The peripheral device interface 118 transmits information received by the peripheral device interface 118 from the I/O subsystem 106 or a sensor (such as the proximity sensor 166), the accelerometer 168, and/or the microphone 113 (by using the audio frequency circuit system 110). The information received by the peripheral device interface 118 from the I/O subsystem 106 includes information from the touch-sensitive display 112 or the touch-sensitive surface.

In some embodiments, the event monitor 171 sends a request to the peripheral device interface 118 at a predetermined interval. As a response, the peripheral device interface 118 transmits event information. In other embodiments, the peripheral device interface 118 transmits event information only when a significant event occurs (for example, when input that is greater than a predetermined noise threshold is being received and/or input that exceeds predetermined duration is being received).

In some embodiments, the event classifier 170 further includes a hit view determining module 172 and/or an active-event recognizer determining module 173.

When the touch-sensitive display 112 displays more than one view, the hit view determining module 172 provides a software process used to determine a place in which the sub-event occurs in one or more views. The view includes a control and another element that can be seen by the user on the display.

Another aspect of a user interface associated with an application program is a group of views, which are also referred to as application program views or user interface windows in this specification sometimes, and therein information is displayed and a touch-based gesture occurs. An application program view (of a corresponding application program) in which a touch is detected may be corresponding to a programming level in an application program or a programming level in a view hierarchical structure. For example, a lowest level view in which a touch is detected may be referred to as a hit view, and an event set recognized as correct input may be at least partially determined based on a hit view that starts from an initial touch of a touch-based gesture.

The hit view determining module 172 receives information related to a sub-event of the touch-based gesture. When an application program has multiple views that are organized in a hierarchical structure, the hit view determining module 172 recognizes a hit view as a lowest view, in the hierarchical structure, that should process the sub-event. In most cases, the hit view is a lowest level view in which an initiation sub-event (that is, the first sub-event in a sub-event sequence that forms an event or a potential event) occurs. Once the hit view is recognized by the hit view determining module, the hit view generally receives all sub-events related to a same touch or input source corresponding to the hit view that is recognized.

The active-event recognizer determining module 173 determines a view or views, in the view hierarchical structure, that should receive a specific sub-event sequence. In some embodiments, the active-event recognizer determining module 173 determines that only the hit view should receive a specific sub-event sequence. In other embodiments, the active-event recognizer determining module 173 determines that all views including a sub-event physical position are active views, and therefore determines that all the active views should receive a specific sub-event sequence. In other embodiments, even if a touch sub-event is entirely limited to an area associated with a specific view, a higher view in the hierarchical structure still remains an active view.

The event scheduler module 174 schedules event information to an event recognizer (for example, an event recognizer 180). In an embodiment involving the active-event recognizer determining module 173, the event scheduler module 174 transfers the event information to an event recognizer determined by the active-event recognizer determining module 173. In some embodiments, the event scheduler module 174 stores the event information in an event queue, and the event information is retrieved by a corresponding event receiver module 182.

In some embodiments, the operating system 126 includes the event classifier 170. Alternatively, the application program 136-1 includes the event classifier 170. In another embodiment, the event classifier 170 is an independent module, or is a part of another module (such as the touch/movement module 130) stored in the memory 102.

In some embodiments, the application program 136-1 includes multiple event processing programs 190 and one or more application program views 191, where each of the multiple event processing programs 190 and the one or more application program views 191 includes an instruction used to process a touch event that occurs in a corresponding view of a user interface of the application program. Each application program view 191 of the application program 136-1 includes one or more event recognizers 180. Generally, the corresponding application program view 191 includes multiple event recognizers 180. In other embodiments, one or more of the event recognizers 180 are a part of an independent module. The independent module is, for example, a user interface toolkit (not shown) or a higher level object from which the application program 136-1 inherits a method and another characteristic. In some embodiments, the corresponding event processing program 190 includes one or more of the following: a data updater 176, an object updater 177, a GUI updater 178, or event data 179 received from the event classifier 170. The event processing program 190 may update the application program internal status 192 by using or invoking the data updater 176, the object updater 177, or the GUI updater 178. Alternatively, one or more of the application program views 191 include one or more corresponding event processing programs 190. In addition, in some embodiments, one or more of the data updater 176, the object updater 177, or the GUI updater 178 are included in the corresponding application program view 191.

A corresponding event recognizer 180 receives event information (for example, the event data 179) from the event classifier 170, and identifies an event by using the event information. The event recognizer 180 includes an event receiver 182 and an event comparator 184. In some embodiments, the event recognizer 180 further includes at least one subgroup of the following: metadata 183 or an event transfer instruction 188 (which may include a sub-event transfer instruction).

The event receiver 182 receives event information from the event classifier 170. The event information includes information about a sub-event, for example, a touch or a touch movement. According to the sub-event, the event information further includes other information, such as a position of the sub-event. When the sub-event relates to a touch movement, the event information may further include a speed and a direction of the sub-event. In some embodiments, an event includes that a device rotates from one orientation to another orientation (for example, rotates from a portrait orientation to a landscape orientation, and vice versa), and the event information includes corresponding information related to a current orientation (also referred to as a device posture) of the device.

The event comparator 184 compares the event information with a definition of a predefined event or sub-event, and based on the comparison, determines an event or a sub-event, or determines or updates a status of an event or a sub-event. In some embodiments, the event comparator 184 includes an event definition 186. The event definition 186 includes a definition of an event (for example, a predefined sub-event sequence), for example, an event 1 (187-1), an event 2 (187-2), and another event. In some embodiments, sub-events in an event 187 include, for example, a touch start, a touch end, a touch movement, touch cancellation, and multi-touch. In an example, a definition of the event 1 (187-1) is a double tap on a displayed object. For example, the double tap includes a first touch of predetermined duration on the displayed object (a touch starts), first raising of predetermined duration (the touch ends), a second touch of predetermined duration on the displayed object (a touch starts), and second raising of predetermined duration (the touch ends). In another example, a definition of the event 2 (187-2) is a drag on a displayed object. For example, the drag includes a touch (or contact) of predetermined duration on the displayed object, a touch movement on the touch-sensitive display 112, and raising of the touch (the touch ends). In some embodiments, the event further includes information used for one or more associated event processing programs 190.

In some embodiments, the event definition 187 includes a definition of an event used for a corresponding user interface object. In some embodiments, the event comparator 184 executes a hit test to determine a user interface object associated with a sub-event. For example, in application program views of three user interface objects displayed on the touch display 112, when a touch is detected on the touch-sensitive display 112, the event comparator 184 executes a hit test to determine which one of the three user interface objects is associated with the touch (a sub-event). If each displayed object is associated with a corresponding event processing program 190, the event comparator uses a result of the hit test to determine which event processing program 190 should be activated. For example, the event comparator 184 selects an event processing program associated with an object and a sub-event that trigger the hit test.

In some embodiments, the definition of the corresponding event 187 further includes a delay action. The delay action delays transfer of the event information until it is determined that the sub-event sequence is indeed corresponding to or is indeed not corresponding to an event type of the event recognizer.

When determining that a sub-event string does not match any event in the event definition 186, the corresponding event recognizer 180 enters an event impossible state, an event failure state, or an event end state, and then ignores a subsequent sub-event of the touch-based gesture. In this case, for the hit view, another event recognizer (if any) that remains active continues to track and process an on-going sub-event of the touch-based gesture.

In some embodiments, the corresponding event recognizer 180 includes the metadata 183 having a configurable attribute, identifier, and/or list that indicates how an event transfer system executes sub-event transfer of an active-event recognizer. In some embodiments, the metadata 183 includes a configurable attribute, identifier, and/or list that indicates how event recognizers can interact with each other. In some embodiments, the metadata 183 includes a configurable attribute, identifier, and/or list that indicates whether a sub-event is transferred to a view or a changing level in a programming hierarchical structure.

In some embodiments, when one or more specific sub-events of an event are recognized, the corresponding event recognizer 180 activates an event processing program 190 associated with the event. In some embodiments, the corresponding event recognizer 180 transfers event information associated with the event to the event processing program 190. Activating the event processing program 190 is different from sending (and delaying sending) the sub-event to a corresponding hit view. In some embodiments, the event recognizer 180 issues an identifier associated with a recognized event, and the event processing program 190 associated with the identifier receives the identifier and executes a predetermined process.

In some embodiments, the event transfer instruction 188 includes a sub-event transfer instruction for transferring event information related to a sub-event but not activating an event processing program. On the contrary, the sub-event transfer instruction transfers event information to an event processing program associated with a sub-event string or transfers event information to an active view. The event processing program associated with the sub-event string or associated with the active view receives the event information and executes a predetermined process.

In some embodiments, the data updater 176 creates and updates data used in the application program 136-1. For example, the data updater 176 updates a telephone number used in the contact module 137, or a video file stored and used in the video player module 145. In some embodiments, the object updater 176 creates and updates an object used in the application program 136-1. For example, the object updater 177 creates a new user interface object, or updates a location of a user interface object. The GUI updater 178 updates a GUI. For example, the GUI updater 178 prepares display information and sends the display information to the graphics module 132 to display the display information on the touch-sensitive display.

In some embodiments, the event processing program 190 includes or has rights of access to the data updater 176, the object updater 177, and the GUI updater 178. In some embodiments, the data updater 176, the object updater 177, and the GUI updater 178 are included in a single module of a corresponding application program 136-1 or application program view 191. In other embodiments, the data updater 176, the object updater 177, and the GUI updater 178 are included in two or more software modules.

It should be understood that the foregoing description of processing a user touch event on the touch-sensitive display is also applicable to user input, in another form, performed by using an input device to operate the electronic device 100 (not all input are initiated on the touchscreen), for example, coordination between a mouse movement and a mouse button press (having or not having a single-keyboard or multi-keyboard press or hold), a user movement on the touchpad such as a tap, a drag, roll, stylus input, a movement of the device, an oral instruction, a detected eye movement, biometric feature input, and/or any combination thereof. They may be used as input corresponding to a sub-event of an event defined to be recognized.

Figure 2:
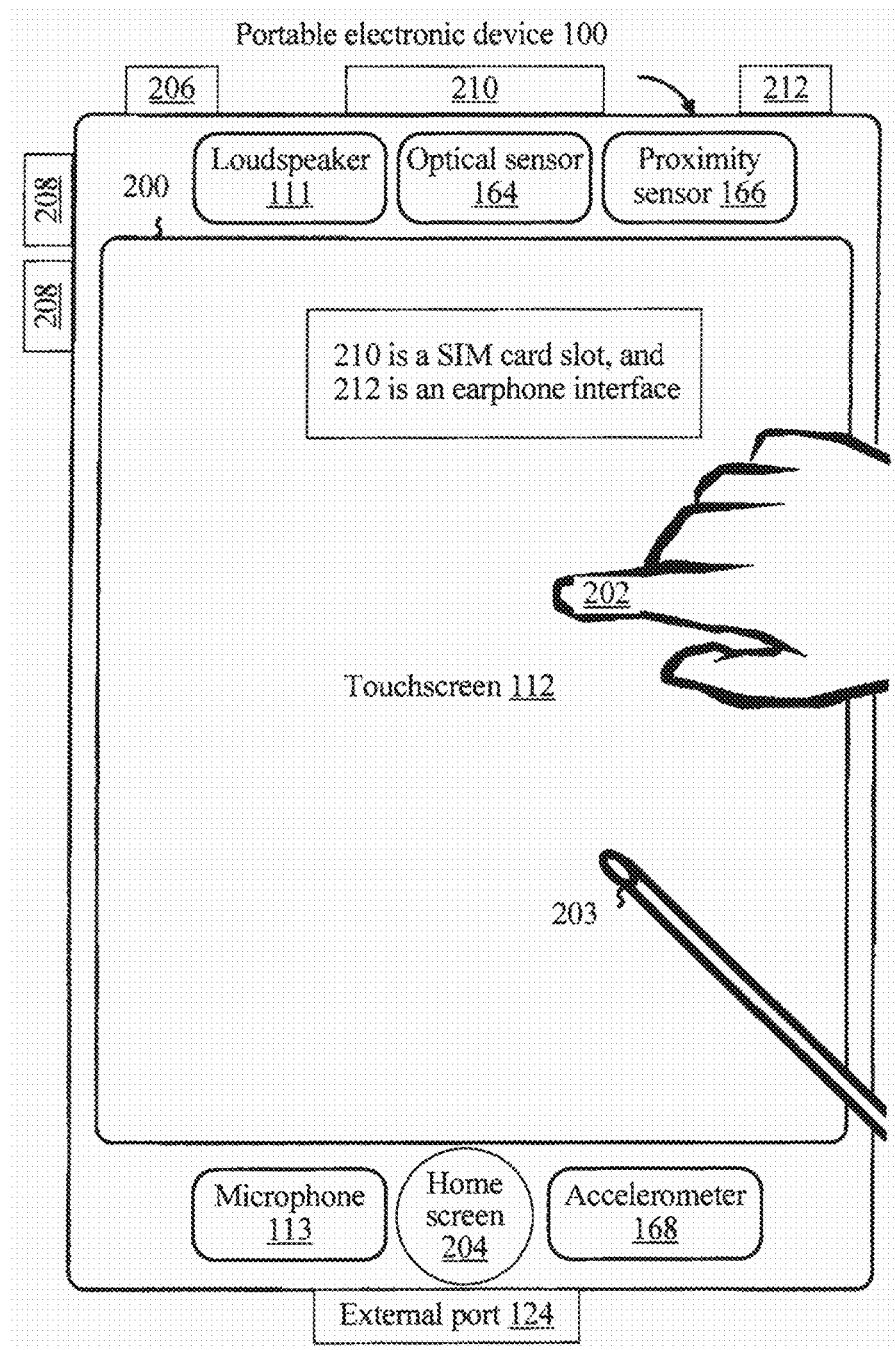
FIG. 2 shows a portable electronic device having a touchscreen according to some embodiments.

FIG. 2 shows a portable electronic device 100 having a touchscreen 112 according to some embodiments. The touchscreen can display one or more graphics on an user interface (UI) 200. In this embodiment and other embodiments described in the following, a user may select one or more of graphics by using, for example, one or more fingers 202 (not drawn in proportion in the accompanying drawing) or one or more styluses 203 (not drawn in proportion in the accompanying drawing) to make a gesture on the graphics.

In some embodiments, when the user disconnects contact with the one or more graphics, the one or more graphics are selected. In some embodiments, the gesture may include tap for one or more times, slide for one or more times (from left to right, from right to left, upward and/or downward), and/or flick (from right to left, from left to right, upward and/or downward) by a finger in contact with the device 100. In some embodiments, contacting with graphics by accident does not select the graphics. For example, when a gesture corresponding to selection is a tap, a swipe gesture that swipes on an application program icon does not select the corresponding application program.

The device 100 may further include one or more physical buttons, for example, a "home screen" or a menu button 204. As described above, the menu button 204 may be configured to navigate to any application program 136 in a group of application programs that can run on the device 100. Alternatively, in some embodiments, the menu button is implemented as a softkey in a GUI displayed on the touchscreen 112.

In an embodiment, the device 100 includes a touchscreen 112, a menu button 204, a push button 206 that is configured to switch on/off and lock the device, (one or more) volume adjustment buttons 208, a subscriber identity module (SIM) card slot 210, a headset jack 212, and a docking/charging external port 124. The push button 206 may be configured to switch on/off the device by pressing the button and keeping the button in a pressed state to reach a predefined time interval; lock the device by pressing the button and releasing the button within the predefined time interval; and/or unlock the device or initiate an unlocking process. In an optional embodiment, the device 100 may further receive, by using a microphone 113, voice input that is used to activate or deactivate some functions.

Figure 3A:
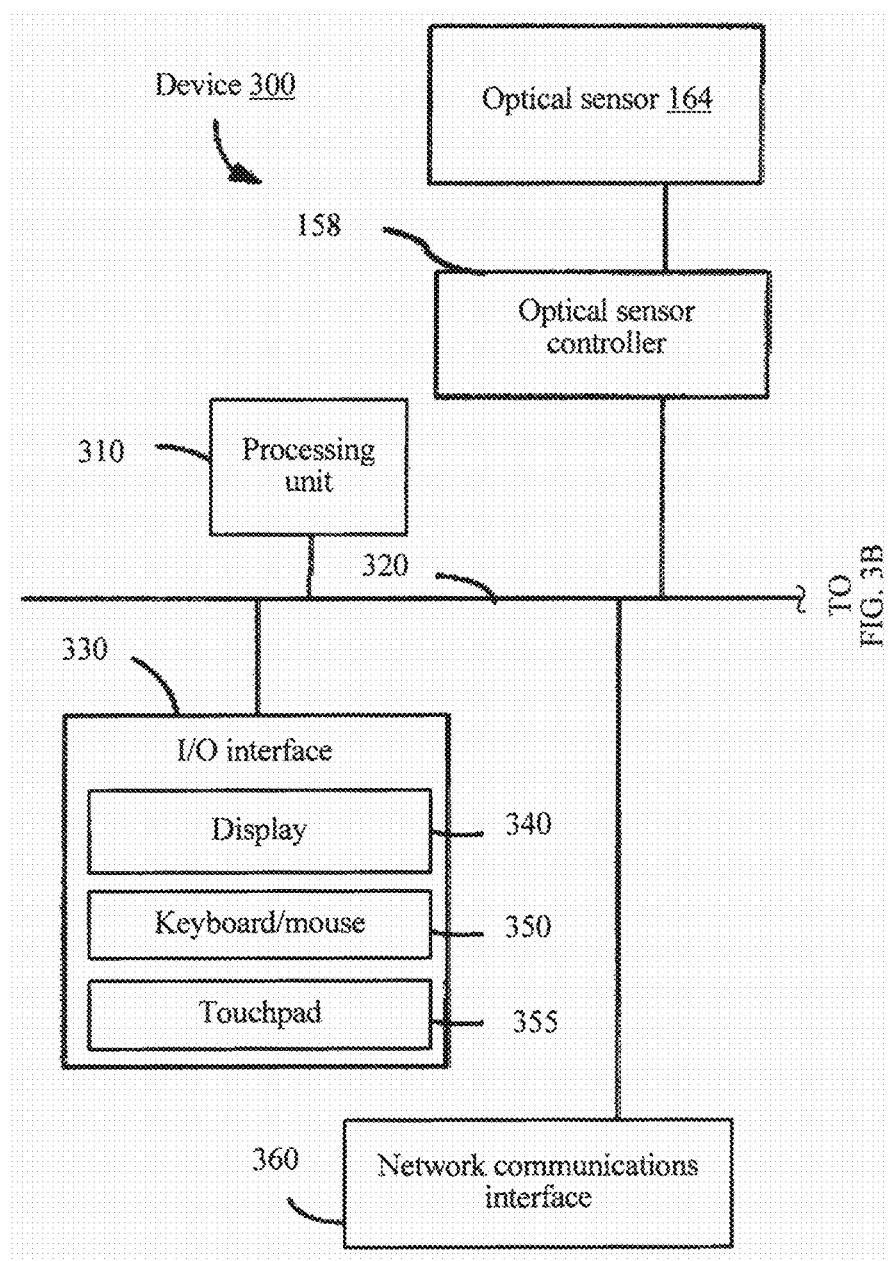
Figure 3B:
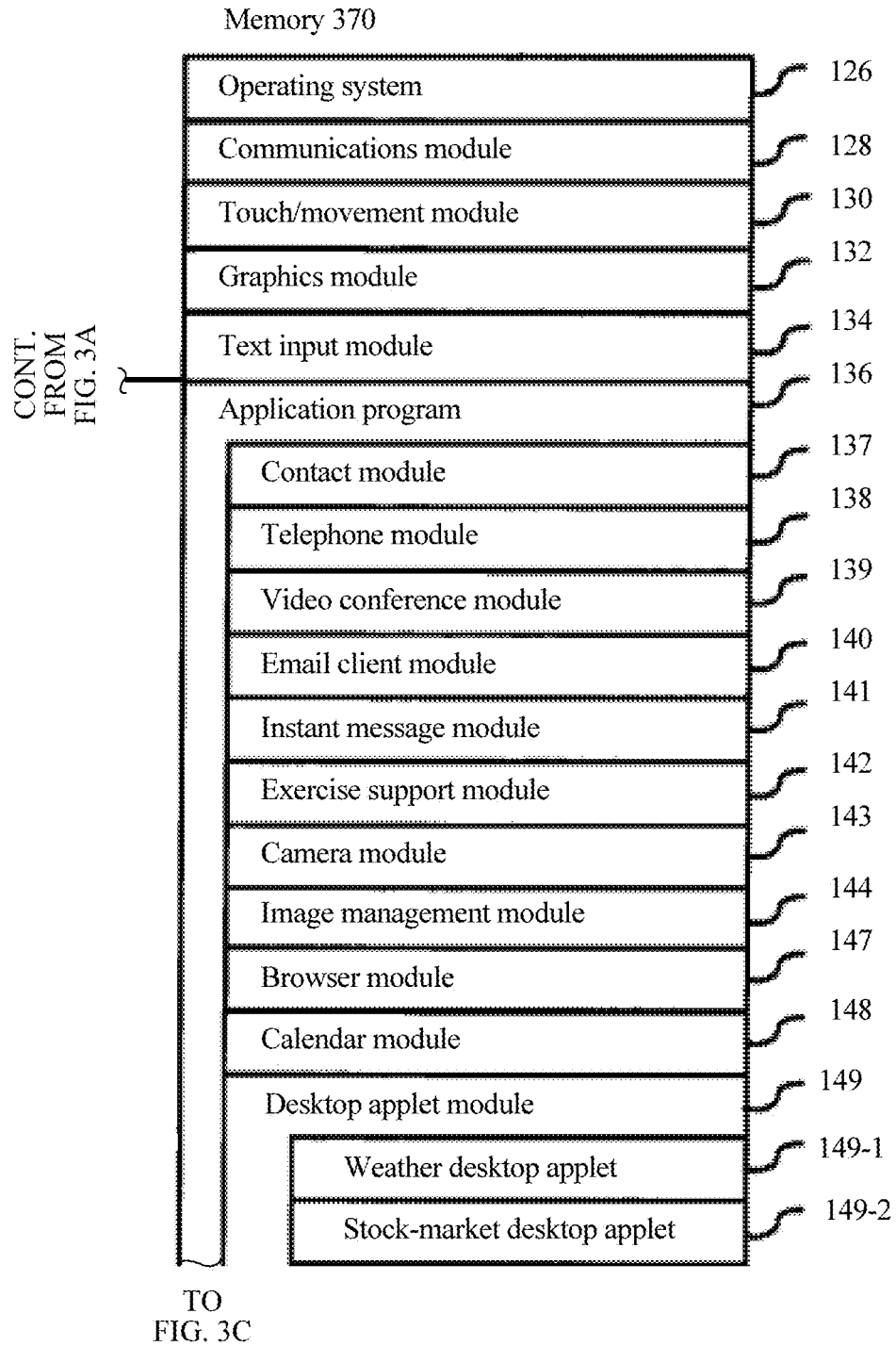

FIG. 3A, FIG. 3B, and FIG. 3C are block diagrams of an exemplary electronic device having a display and a touch-sensitive surface according to some embodiments. A device 300 is unnecessarily portable. In some embodiments, the device 300 is a laptop computer, a desktop computer, a tablet computer, a multimedia player device, a navigation device, an education facility (such as a learning toy for children), a game system, or a control device (for example, a home or industrial controller). The device 300 generally includes one or more processing units (CPU) 310, one or more networks or another communications interface 360, a memory 370, and one or more communications buses 320 configured to interconnect the components. In some embodiments, the processing unit 310 includes an image signal processor and a dual-core or multi-core processor. The communications bus 320 may include a circuit system (sometimes referred to as a chip set) that interconnects system components and that controls communication between the system components. The device 300 includes an input/output (I/O) interface 330 that has a display 340. The display 340 is generally a touchscreen display. The I/O interface 330 may further include a keyboard and/or a mouse (or another pointing device) 350 and a touchpad 355. The device 300 further includes an optical sensor 164 and an optical sensor controller 158. The memory 370 includes a high-speed random access memory, for example, a DRAM, an SRAM, a DDR RAM, or another random access solid-state storage device; and may include a non-volatile memory such as one or more magnetic disk storage devices, optical disc storage devices, flash memory devices, or other non-volatile solid-state storage devices. Optionally, the memory 370 may include one or more storage devices that perform remote location by using the CPU 310. In some embodiments, the memory 370 stores a program, a module, and a data structure, or a subgroup thereof similar to the program, the module, and the data structure that are stored in the memory 102 of the portable electronic device 100 (in FIG. 1). In addition, the memory 370 may store another program, module, and data structure that do not exist in the memory 102 of the portable electronic device 100. For example, the memory 370 of the device 300 may store a drawing module 380, a presentation module 382, a word processing module 384, a web page creating module 386, a disk editing module 388, and/or a spreadsheet module 390, while the memory 102 of the portable electronic device 100 (in FIG. 1) may not store these modules.

Each of the foregoing recognized elements in FIG. 3A TO FIG. 3C may be stored in one or more storage devices mentioned above. Each of the foregoing recognized modules is corresponding to a set of instructions that are used to execute the foregoing functions. The foregoing recognized modules or programs (that is, instruction sets) do not need to be implemented as independent software programs, processes, or modules. In addition, various subgroups of the modules may be combined or rearranged in another manner in various embodiments. In some embodiments, the memory 370 may store a subgroup of the foregoing modules and data structures. In addition, the memory 370 may store another module and data structure that are not described above.

Now, a description is provided for an embodiment of a user interface ("UI") that may be implemented on the portable electronic device 100.

FIG. 4 shows an exemplary user interface, on the portable electronic device 100, used for an application program menu according to some embodiments. A similar user interface may be implemented on the device 300. In some embodiments, a user interface 400 includes the following elements or a subgroup or a superset of the elements: a signal strength indicator 402 of wireless communication (such as a mobile phone signal and a Wi-Fi signal); a time 404; a Bluetooth indicator 405; a battery status indicator 406; a tray 408 that has an icon of a common application program, where the common application program is, for example, as follows: a telephone 138, which may include an indicator 414 indicating a quantity of missed calls or voice mail messages; an email client 140, which may include an indicator 410 indicating a quantity of unread emails; a browser 147; and a video and music player 152, which is also referred to as an iPod (a trademark of Apple Inc.) module 152; and an icon of another application program, where the another application program is, for example, as follows: an IM 141; image management 144; a camera 143; weather 149-1; a stock market 149-2; exercise support 142; a calendar 148; an alarm clock 149-4; a map 154; a memo 153; a setting 412, which provides access to settings of the device 100 and settings of various application programs 136 of the device 100; and an online video module 155, which is also referred to as a YouTube (a trademark of Google Inc.) module 155.

In addition, although the following examples are mainly provided with reference to finger input (for example, single-finger contact, a single-finger tap gesture, or a single-finger swipe gesture), it should be understood that in some embodiments, one or more of the finger input are replaced with input (for example, stylus input) from another input device.

An user interface and an associated process are as follows.

Now, a description is provided for an embodiment of a user interface ("UI") that may be implemented on an electronic device (such as the device 300 or the portable electronic device 100) having a display and a touch-sensitive surface, and an associated process.

An embodiment of the present invention provides a method, which is applied to a portable electronic device including a display and multiple application programs. The display includes a touch-sensitive surface and a display screen. As shown in FIG. 5, the method includes the following steps:

Step 101: Display a first application interface element in a first area of the display screen, where the first application interface element is corresponding to a first application program.

Step 102: Display a second application interface element in a second area of the display screen, where the second application interface element indicates that a new message corresponding to the first application program is generated, and the second area and the first area at least partially overlap.

Step 103: Detect a first gesture.

Step 104: Display the second application interface element in a third area of the display screen to respond to the first gesture, where the third area and the first area do not overlap.

According to the method described in this embodiment of the present invention, it may be convenient to independently manage a new message associated with an application, which saves system resources occupied by starting the application to process the new message.

The detecting a first gesture may include one or more of the following:

1. It is detected, on the touch-sensitive surface, that the second application interface element is dragged to leave the first application interface element. Specifically, the second application interface element covers the second area on the display screen. The second application interface element is dragged to leave the first application interface element, that is, the second application interface element no longer covers the second area, and also no longer covers the first area that is of the display screen and that is corresponding to the first application interface element. An end point at which a drag action ends may be the third area of the display screen. It may also be understood that the second application interface element no longer covers a union set area of the first area and the second area on the display screen. A drag gesture may be corresponding to the following operations: A user of the portable electronic device directly or indirectly interacts with the display screen by using a limb of the user or a tool, so that a path along which the second application interface element, on which the gesture acts, is moved away from the union set area on the display screen is a set of consecutive pixels, and in the path along which the second application interface element is moved away, the user always maintains, by using the limb of the user or the tool, interaction between the limb of the user or the tool and the second application interface element until the second application interface element arrives at the end point at which the drag action ends.

2. It is detected that the portable electronic device is shaken. A frequency of the shake may be shaking the portable electronic device once or twice per second. The frequency of the shake may be set by a manufacturer of the portable electronic device, or may set by a user of the portable electronic device according to a use habit of the user. A shake direction may be arbitrary, provided that a position of the portable electronic device during the shake is different from a position before the shake. The shake is initiated by the user of the portable electronic device, and shake amplitude is different from vibration amplitude of a motor of the portable electronic device.

3. It is detected, on the touch-sensitive surface, that the second application interface element is slid. A slide gesture may be corresponding to the following operation: A user interacts with the second application interface element by using a limb of the user or a tool and through a path including consecutive pixels. The path including consecutive pixels runs through the second area covered by the second application interface element.

4. It is detected, on the touch-sensitive surface, that the first application interface element is slid. A slide gesture may be corresponding to the following operation: A user interacts with the first application interface element by using a limb of the user or a tool and through a path including consecutive pixels. The path including consecutive pixels runs through the first area covered by the first application interface element.

5. It is detected, on the touch-sensitive surface, that both the first application interface element and the second application interface element are dragged to be separated. That both the first application interface element and the second application interface element are dragged to be separated means that a user of the portable electronic device directly or indirectly interacts with the display screen by using a limb of the user or a tool, so as to act on the first application interface element and the second application interface element, and a drag path of the first application interface element is different from that of the second application interface element. Because the drag path of the first application interface element is different from that of the second application interface element, after both the first application interface element and the second application interface element are dragged, relative locations of the first application interface element and the second application interface element are different compared with relative positions located before the application interface elements are dragged. Therefore, after both the first application interface element and the second application interface element are dragged, the first application interface element and the second application interface element are separated.

In addition, before the detecting a first gesture, the method further includes the following one or more steps, and the following steps relate to an operation of selecting the second application interface element and/or the first application interface element:

1. Detect, on the touch-sensitive surface, that the second application interface element is touched and held. Touch and hold herein means that a user of the portable electronic device directly or indirectly interacts with the display screen by using a limb of the user or a tool, so as to act on the second application interface element, so that a time of acting on the second area that is of the display screen and that is corresponding to the second application interface element is longer than a first time length. Herein, the first time length may be set by a manufacturer of the portable electronic device, or may set by the user of the portable electronic device according to a use habit of the user. Specifically, the first time length may be 5 seconds.

2. Detect that the portable electronic device is shaken. For a shake operation, reference may be made to the description of detecting that the portable electronic device is shaken in the description of detecting a first gesture. Details are not described herein again.

3. Detect, on the touch-sensitive surface, that the second application interface element is slid. For an operation of sliding the second application interface element, reference may be made to the description of detecting that the second application interface element is slid in the description of detecting a first gesture. Details are not described herein again.

4. Detect, on the touch-sensitive surface, that the first application interface element is slid. For an operation of sliding the first application interface element, reference may be made to the description of detecting that the first application interface element is slid in the description of detecting a first gesture. Details are not described herein again.

If there are at least two second application interface elements, the displaying the second application interface element in a third area of the display screen includes: arranging the second application interface elements in a separation manner or in a combination manner, and displaying the second application interface elements in the third area.

Herein the arranging in a combination manner may be specifically arranging the second application interface elements in a combination manner in a folder of the display screen, and outside the folder, a quantity of second application interface elements is displayed by using a third application interface element that at least partially overlaps the third area.

Alternatively, the arranging in a combination manner may be specifically arranging the second application interface elements in a combination manner in a display square frame of the display screen. The display square frame is located in the third area, and the at least two second application interface elements are dispersedly arranged one by one in the display square frame. For example, as shown in FIG. 7, an application program WeChat corresponding to a first application interface element has 12 new messages, an application program Taobao corresponding to a first application interface element has five new messages, an application program QQ corresponding to a first application interface element has four new messages, an application program Path corresponding to a first application interface element has two new messages, and an application program To do corresponding to a first application interface element has three new messages. In this case, in the display square frame (a square frame in a right figure of FIG. 7) located in the third area, the application interface elements respectively corresponding to the application programs are dispersedly arranged and displayed in the display square frame. Each first application interface element has a corresponding second application interface element. The second application interface element and the first application interface element at least partially overlap.

The arranging in a separation manner refers to any arrangement manner different from the arranging in a combination manner.

After the second application interface elements are arranged in a separation manner and displayed in the third area, or the second application interface elements are arranged in a combination manner and displayed in the third area, the method further includes: detecting, on the touch-sensitive surface, that one second application interface element of the at least two second application interface elements is selected, where for a selection operation herein, reference may be made to the foregoing selection operation and details are not described herein again; and displaying, in a fourth area of the display screen, content of the generated new message that is corresponding to the first application program and indicated by the second application interface element, where the fourth area herein is not limited to a specific area of the display screen, provided that the fourth area and the third area do not overlap.

After the detecting, on the touch-sensitive surface, that the second application interface element is dragged to leave the first application interface element, the method further includes: detecting, on the touch-sensitive surface, that dragging the second application interface element is stopped, where that the dragging is stopped means that a drag action starts but the drag action does not arrive at an end point at which the drag action ends; and displaying, in a fourth area of the display screen, content of the generated new message that is corresponding to the first application program and indicated by the second application interface element.

After the detecting, on the touch-sensitive surface, that both the first application interface element and the second application interface element are dragged to be separated, the method further includes: detecting, on the touch-sensitive surface, that both dragging the first application interface element and dragging the second application interface element are stopped, where that the dragging is stopped means that a drag action starts but at a specific time point after the start, interaction between the user of the portable electronic device and the display screen terminates; and displaying, in a fourth area of the display screen, content of the generated new message that is corresponding to the first application program and indicated by the second application interface element.

After the displaying, in a fourth area of the display screen, content of the generated new message that is corresponding to the first application program and indicated by the second application interface element, the method further includes: detecting, on the touch-sensitive surface, that a fifth area outside the fourth area is tapped, and stopping displaying, in the fourth area of the display screen, the content of the generated new message that is corresponding to the first application program and indicated by the second application interface element; where a location of the fifth area is not limited, provided that the fifth area is different from the fourth area on the display screen.

FIG. 6 and FIG. 7 show an exemplary user interface used to separate application interface elements (for example, application program icons) according to some embodiments. User interfaces in the accompanying drawings are used to illustrate the following described processes and/or functions including processes and/or functions in FIG. 6 and FIG. 7.

For a specific operation, reference may be made to FIG. 6. As shown in FIG. 6, there is a prompt (which is specifically an icon prompt in FIG. 6) of a missed call on an upper right corner of an incoming call icon (which is an example of one element on a graphical user interface in FIG. 6) on a lower left corner in a left figure. The prompt and the incoming call icon overlap in a specific range. As shown in a middle figure in FIG. 6, the prompt of the missed call is selected by a finger of the user and is moved away from the incoming call icon. After the user releases the finger, as shown in a right figure in FIG. 6, in a blank area of a current display interface (which is specifically embodied as right above the missed call in this example), two of the missed calls are displayed in a new display window. A calling party of one missed call is a contact of the user: A Bao. A calling party of the other missed call is a mobile phone user whose telephone number starts with 1850.

When the user taps an area outside the new display window again (for example, after the user has read the new messages), the new display window may be closed.

For a specific operation, reference may be further made to FIG. 7. As shown in FIG. 7, a left figure displays a case in which multiple applications in a folder have update prompt messages. Specifically, a total of 26 update messages exist in the folder. However, which specific application has a new message and how many new messages that the application has are unknown. As shown in FIG. 7, the user selects and moves away 26 update tags in the folder, and releases the tags in a proper blank area on another non-current display page. As shown in a right figure in FIG. 7, when the user releases a finger that moves away the tags, application programs to which the 26 new messages belong are displayed in the proper blank area on the non-current display page. Four new messages belong to an application program QQ, five new messages belong to an application program Taobao, 12 new messages belong to an application program WeChat, two new messages belong to an application program Path, and three new messages belong to an application program To do.

Further, the user may tap one or more of five application program icons again in the right figure, to read a new message of a corresponding application program.

When the user taps an area outside a new display window again (for example, after the user has read the new messages), the new display window may be closed.

By using the method for processing a new message associated with an application in Embodiment 4 of the present invention, it may be implemented that it is convenient to independently manage, by using multiple types of operation manners, a new message associated with an application, which saves system resources occupied by starting the application to process the new message. In addition, user operation experience may be enriched.

According to some embodiments, FIG. 8 is a functional block diagram of an electronic device that is configured according to the foregoing principles of the present invention. A function block of the device may be implemented in hardware, software, or a combination of the software and the hardware to execute the principles of the present invention. Persons skilled in the art can understand that the function block in FIG. 8 may be combined or separated into sub-blocks to implement the foregoing principles of the present invention. Therefore, the description in this specification may support any possible combination or separation or further limitation of the function block in this specification.

This embodiment of the present invention further provides an apparatus. As shown in FIG. 8, FIG. 8 is a schematic diagram of a general structure of the apparatus.

The following describes a function of an electronic device. Persons skilled in the art can understand that the following functions are corresponding to the embodiments of the electronic device, the system, the apparatus, the method, the graphical user interface, the information processing apparatus (for example, a processor chip or a processor chip set), and the computer readable storage medium that are described in this specification. Mutual combinations thereof and/or various cases of the combinations are combinations that may be considered, directly and without question, by persons of ordinary skill in the art after they understand this specification.

The apparatus includes: an apparatus 201 that is configured to display a first application interface element in a first area of the display screen, where the first application interface element is corresponding to a first application program; an apparatus 202 that is configured to display a second application interface element in a second area of the display screen, where the second application interface element indicates that a new message corresponding to the first application program is generated, and the second area and the first area at least partially overlap; an apparatus 203 that is configured to detect a first gesture; and an apparatus 204 that is configured to display the second application interface element in a third area of the display screen to respond to the first gesture, where the third area and the first area do not overlap.

For functions implemented by the foregoing apparatuses, reference may be made to corresponding steps in the foregoing method embodiment. Details are not described herein again.

According to the apparatus in this embodiment, and by using the apparatus in this embodiment of the present invention, it may be implemented that it is convenient to independently manage, by using multiple types of operation manners, a new message associated with an application, which saves system resources occupied by starting the application to process the new message. In addition, user operation experience may be enriched.

It should be understood that, after understanding this specification, persons of ordinary skill in the art may realize that the foregoing operations with reference to FIG. 5 and FIG. 8 may be implemented by the components shown in FIG. 1A to FIG. 1C to FIG. 1D. For example, an event monitor 171 in an event classifier 170 detects contact on a touch-sensitive display 112, and an event scheduler module 174 transfers event information to an application program 136-1. A corresponding event recognizer 180 of the application program 136-1 compares the event information with a corresponding event definition 186, and determines whether first contact at a first location on a touch-sensitive surface is corresponding to a predefined event or sub-event, for example, selecting a user interface object. When the corresponding predefined event or sub-event is detected, the event recognizer 180 activates and detects an event processing program 190 associated with the event or sub-event. The event processing program 190 may update an application program internal status 192 by using or invoking a data updater 176 or an object updater 177. In some embodiments, the event processing program 190 updates, by accessing a corresponding GUI updater 178, displayed content of the application program. Similarly, persons skilled in the art clearly know how another process may be implemented based on the components shown in FIG. 1A TO FIG. 1C to FIG. 1D.

For a purpose of explanation, the foregoing description is described with reference to a specific embodiment. However, the foregoing exemplary description is not intended to be detailed, and is not intended to limit the present invention to a disclosed precise form. According to the foregoing teaching content, many modification forms and variation forms are possible. Embodiments are selected and described to fully illustrate the principles of the present invention and actual application of the principles, so that other persons skilled in the art can make full use of the present invention and the various embodiments that have various modifications applicable to conceived specific purposes.

What is claimed is:

1. A portable electronic device, comprising:
a display screen;
one or more processors coupled to the display screen;
a memory coupled to the one or more processors and comprising one or more programs and multiple application programs, wherein the one or more programs are configured to be executed by the one or more processors, wherein the one or more programs comprise instructions, and wherein the instructions cause the one or more processors to:
display a first application interface element in a first area of the display screen, wherein the first application interface element corresponds to a first application program;
display a second application interface element in a second area of the display screen, wherein the second application interface element indicates that new messages a corresponding to the first application program are generated, and wherein the second area and the first area at least partially overlap;
detect a first gesture;
display the second application interface element in a third area of the display screen to respond to the first gesture, wherein the third area and the first area do not overlap, and wherein the second application interface element shows additional information about the first application interface element; and
change the second application interface element from displaying an indication of the new messages to displaying the additional information in response to the first gesture being detected, wherein the first gesture comprises an operation of dragging the second application interface element, wherein the indication of the new messages comprises a numerical identifier, wherein the numerical identifier indicates a number greater than one, wherein the first application interface element and the second application interface element are displayed on the display screen simultaneously, wherein the additional information comprises textual information, wherein the numerical identifier corresponding to the new messages is transformed into the textual information by the dragging such that the textual information replaces the numerical identifier, wherein the textual information and the numerical identifier are not displayed on the display screen at a same time, wherein the textual information corresponds to at least two of the new messages such that the textual information simultaneously shows information about the at least two of the new messages at a same time, and wherein a size of the second application interface element is different than a size of the first application interface element.

2. The portable electronic device of claim 1, wherein detecting the first gesture comprises detecting that the second application interface element is dragged to leave the first application interface element.

3. The portable electronic device of claim 1, wherein detecting the first gesture comprises detecting that the portable electronic device is shaken.

4. The portable electronic device of claim 1, wherein detecting the first gesture comprises detecting that the second application interface element is slid.

5. The portable electronic device of claim 1, wherein detecting the first gesture comprises detecting that the first application interface element is slid.

6. The portable electronic device of claim 1, wherein detecting the first gesture comprises detecting that both the first application interface element and the second application interface element are dragged to be separated.

7. The portable electronic device of claim 1, wherein before detecting the first gesture, the instructions further instruct the one or more processors to detect that the second application interface element is touched and held.

8. The portable electronic device of claim 1, wherein before detecting the first gesture, the instructions further instruct the one or more processors to detect that the portable electronic device is shaken.

9. The portable electronic device of claim 1, wherein before detecting the first gesture, the instructions further instruct the one or more processors to detect that the second application interface element is slid.

10. The portable electronic device of claim 1, wherein before detecting the first gesture, the instructions further instruct the one or more processors to detect that the first application interface element is slid.

11. The portable electronic device of claim 1, wherein displaying the second application interface element in the third area of the display screen when at least two first application programs generate new messages corresponding to the at least two first application programs comprises:
arranging the second application interface elements in a separation manner or in a combination manner; and
displaying the second application interface elements in the third area.

12. The portable electronic device of claim 11, wherein after the second application interface elements are arranged in the separation manner and displayed in the third area, or the second application interface elements are arranged in the combination manner and displayed in the third area, the instructions further instruct the one or more processors to:
detect that one second application interface element of the at least two second application interface elements is selected; and
display, in a fourth area of the display screen, content of the generated new message that corresponds to the first application program and is indicated by the second application interface element.

13. The portable electronic device of claim 2, wherein after detecting that the second application interface element is dragged to leave the first application interface element, the instructions further instruct the one or more processors to:
detect that dragging the second application interface element is stopped; and
display, in a fourth area of the display screen, content of the generated new message that corresponds to the first application program and is indicated by the second application interface element.

14. The portable electronic device of claim 6, wherein after detecting that both the first application interface element and the second application interface element are dragged to be separated, the instructions further instruct the one or more processors to:
detect that both dragging the first application interface element and dragging the second application interface element are stopped; and
display, in a fourth area of the display screen, content of the generated new message that corresponds to the first application program and is indicated by the second application interface element.

15. The portable electronic device of claim 12, wherein after displaying, in the fourth area of the display screen, content of the generated new message that corresponds to the first application program and is indicated by the second application interface element, the instructions further instruct the one or more processors to:
  detect that a fifth area outside the fourth area is tapped; and
  stop displaying, in the fourth area of the display screen, the content of the generated new message that corresponds to the first application program and is indicated by the second application interface element.

16. An information processing apparatus used in a portable electronic device comprising a display screen and multiple application programs, wherein the information processing apparatus is configured to:
  display a first application interface element in a first area of the display screen, wherein the first application interface element corresponds to a first application program;
  display a second application interface element in a second area of the display screen, wherein the second application interface element indicates that new messages corresponding to the first application program are generated, and wherein the second area and the first area at least partially overlap;
  detect a first gesture;
  display the second application interface element in a third area of the display screen to respond to the first gesture, wherein the third area and the first area do not overlap, and wherein the second application interface element shows additional information about the first application interface element; and
  change the second application interface element from displaying an indication of the new messages to displaying the additional information in response to the first gesture being detected, wherein the first gesture comprises an operation of dragging the second application interface element, wherein the indication of the new messages comprises a numerical identifier, wherein the numerical identifier indicates a number greater than one, wherein the first application interface element and the second application interface element are displayed on the display screen simultaneously, wherein the additional information comprises textual information, wherein the numerical identifier corresponding to the new messages is transformed into the textual information by the dragging such that the textual information replaces the numerical identifier, wherein the textual information and the numerical identifier are not displayed on the display screen at a same time, wherein the textual information corresponds to at least two of the new messages such that the textual information simultaneously shows information about the at least two of the new messages at a same time, and wherein a size of the second application interface element is different than a size of the first application interface element.

17. An information processing apparatus used in a portable electronic device comprising a display screen and multiple application programs, wherein the information processing apparatus is configured to:
  display a first application interface element in a first area of the display screen, wherein the first application interface element corresponds to a first folder that comprises at least two first application programs;
  display a second application interface element in a second area of the display screen, wherein the second application interface element indicates that at least one first application program in the first folder generates new messages corresponding to the at least one first application program, and wherein the second area and the first area at least partially overlap;
  detect a first gesture;
  display the second application interface element in a third area of the display screen to respond to the first gesture, wherein the third area and the first area do not overlap, and wherein the second application interface element shows additional information about the first application interface element; and
  change the second application interface element from displaying an indication of the new message to displaying the additional information in response to the first gesture being detected, wherein the first gesture comprises an operation of dragging the second application interface element, wherein the indication of the new messages comprises a numerical identifier, wherein the numerical identifier indicates a number greater than one, wherein the first application interface element and the second application interface element are displayed on the display screen simultaneously, wherein the additional information comprises textual information, wherein the numerical identifier corresponding to the new messages is transformed into the textual information by the dragging such that the textual information replaces the numerical identifier, wherein the textual information and the numerical identifier are not displayed on the display screen at a same time, wherein the textual information corresponds to at least two of the new messages such that the textual information simultaneously shows information about the at least two of the new messages at a same time, and wherein a size of the second application interface element is different than a size of the first application interface element.

18. A method, applied to a portable electronic device comprising a display screen and multiple application programs, wherein the method comprises:
  displaying a first application interface element in a first area of the display screen, wherein the first application interface element corresponds to a first application program;
  displaying a second application interface element in a second area of the display screen, wherein the second application interface element indicates that new messages corresponding to the first application program is generated, and wherein the second area and the first area at least partially overlap;
  detecting a first gesture;
  displaying the second application interface element in a third area of the display screen to respond to the first gesture, wherein the third area and the first area do not overlap, and wherein the second application interface element shows additional information about the first application interface element; and
  change the second application interface element from displaying an indication of the new messages to displaying the additional information in response to the first gesture being detected, wherein the first gesture comprises an operation of dragging the second application interface element, wherein the indication of the new messages comprises a numerical identifier, wherein the numerical identifier indicates a number greater than one, wherein the first application interface element and the second application interface element are displayed on the display screen simultaneously, wherein the additional information comprises textual information, wherein the numerical identifier corresponding to the new messages is transformed into the textual information by the dragging such that the textual information replaces the numerical identifier, wherein the textual information and the numerical identifier are not displayed on the display screen at a same time, wherein the textual information corresponds to at least two of the new messages such that the textual information simultaneously shows information about the at least two of the new messages at a same time, and wherein a size of the second application interface element is different than a size of the first application interface element.

19. A method, applied to a portable electronic device comprising a display screen and multiple application programs, wherein the method comprises:
- displaying a first application interface element in a first area of the display screen, wherein the first application interface element corresponds to a first folder that comprises at least two first application programs;
- displaying a second application interface element in a second area of the display screen, wherein the second application interface element indicates that at least one first application program in the first folder generates new messages corresponding to the at least one first application program, and wherein the second area and the first area at least partially overlap;
- detecting a first gesture;
- displaying the second application interface element in a third area of the display screen to respond to the first gesture, wherein the third area and the first area do not overlap, and wherein the second application interface element shows additional information about the first application interface element; and
- change the second application interface element from displaying an indication of the new messages to displaying the additional information in response to the first gesture being detected, wherein the first gesture comprises an operation of dragging the second application interface element, wherein the indication of the new messages comprises a numerical identifier, wherein the numerical identifier indicates a number greater than one, wherein the first application interface element and the second application interface element are displayed on the display screen simultaneously, wherein the additional information comprises textual information, wherein the numerical identifier corresponding to the new messages is transformed into the textual information by the dragging such that the textual information replaces the numerical identifier, wherein the textual information and the numerical identifier are not displayed on the display screen at a same time, wherein the textual information corresponds to at least two of the new messages such that the textual information simultaneously shows information about the at least two of the new messages at a same time, and wherein a size of the second application interface element is different than a size of the first application interface element.

20. The method of claim 19, wherein the textual information comprises two names of two different callers.

* * * * *